US012448813B2

(12) United States Patent
Lai

(10) Patent No.: US 12,448,813 B2
(45) Date of Patent: Oct. 21, 2025

(54) OBJECT SHAPED COMBINATION PADLOCK

(71) Applicant: The Sun Lock Company Limited, Tuen Mun (HK)

(72) Inventor: Karl Lai, Tai Po (HK)

(73) Assignee: THE SUN LOCK COMPANY LIMITED, Tuen Mun (HK)

(*) Notice: Subject to any disclaimer, the term of this patent is extended or adjusted under 35 U.S.C. 154(b) by 595 days.

(21) Appl. No.: 17/834,420

(22) Filed: Jun. 7, 2022

(65) Prior Publication Data

US 2023/0212887 A1 Jul. 6, 2023

Related U.S. Application Data

(63) Continuation-in-part of application No. 29/839,385, filed on May 20, 2022, now Pat. No. Des. 1,011,865.

(60) Provisional application No. 63/296,671, filed on Jan. 5, 2022.

(51) Int. Cl.
*E05B 37/14* (2006.01)
*E05B 37/00* (2006.01)

(52) U.S. Cl.
CPC .......... *E05B 37/14* (2013.01); *E05B 37/0034* (2013.01)

(58) Field of Classification Search
CPC ...... E05B 37/10; E05B 37/14; E05B 37/0041; E05B 37/0048; E05B 37/0058; E05B 37/0068; E05B 37/0034
See application file for complete search history.

(56) References Cited

U.S. PATENT DOCUMENTS 5,156,028 A * 10/1992 Jiang ...................... E05B 67/006 70/30
5,664,446 A * 9/1997 Kusmiss ............. E05B 37/0068 70/330
5,715,709 A * 2/1998 Lai .......................... E05B 67/14 70/52
6,227,016 B1 * 5/2001 Yu ........................... E05B 37/14 70/52

(Continued)

FOREIGN PATENT DOCUMENTS

CN 106014006 A 10/2016
CN 108026735 A 5/2018

(Continued)

OTHER PUBLICATIONS

"Car Shaped Multi Use Padlock Combination Lock Metal for Small Locks Box Bike Etc" Ebay. https://www.ebay.com/itm/126674065263 (Year: 2024).*

(Continued)

*Primary Examiner* — Christine M Mills
*Assistant Examiner* — Faria F Ahmad
(74) *Attorney, Agent, or Firm* — Ware, Fressola, Maguire & Barber LLP

(57) ABSTRACT

An object padlock comprising, an object looking cover/body shape, at least one dial to control the opening of the lock as a primary control mechanism which is said to be a combination mode, a locking means such as a cable with one end always in the padlock and the other end such as a flexible-end can be locked and opened via a combination dial control, and at least a cylinder to control the opening of the lock as a secondary control mechanism which is said to be unlock by key mode.

31 Claims, 19 Drawing Sheets

(56) References Cited

U.S. PATENT DOCUMENTS

| | | | | |
|---|---|---|---|---|
| 6,363,758 | B1 * | 4/2002 | Ling | E05B 37/025 70/30 |
| 6,408,660 | B1 * | 6/2002 | Lai | G09F 3/0352 40/6 |
| 7,370,498 | B1 | 5/2008 | Miao | |
| 7,467,531 | B2 * | 12/2008 | Lai | E05B 37/025 70/432 |
| 7,685,851 | B2 * | 3/2010 | Lai | E05B 37/025 70/30 |
| 8,261,583 | B2 * | 9/2012 | Lai | E05B 37/0034 70/284 |
| 8,931,313 | B2 * | 1/2015 | Lai | E05B 37/025 70/284 |
| 9,890,559 | B2 * | 2/2018 | Lai | E05B 67/22 |
| 10,047,541 | B2 * | 8/2018 | Lai | E05B 17/145 |
| 10,221,591 | B2 * | 3/2019 | Lai | E05B 67/24 |
| 10,443,272 | B2 * | 10/2019 | Lai | E05B 37/0034 |
| D914,481 | S * | 3/2021 | Lai | D8/335 |
| D1,011,865 | S * | 1/2024 | Lai | E05B 37/0034 D8/334 |
| 2006/0170550 | A1 * | 8/2006 | Marsilio | G08B 13/2434 340/568.2 |
| 2006/0243005 | A1 | 11/2006 | Lai et al. | |
| 2009/0113947 | A1 | 5/2009 | Lai et al. | |
| 2009/0120141 | A1 * | 5/2009 | Huang | E05B 37/025 70/24 |
| 2009/0249841 | A1 * | 10/2009 | Holmes | E05B 37/00 70/315 |
| 2010/0095718 | A1 | 4/2010 | Lai et al. | |
| 2012/0304711 | A1 | 12/2012 | Misner et al. | |
| 2016/0186466 | A1 | 6/2016 | Ng | |
| 2020/0318390 | A1 * | 10/2020 | Bartel | E05B 37/0055 |
| 2022/0065001 | A1 * | 3/2022 | Lai | E05B 67/003 |
| 2024/0044172 | A1 * | 2/2024 | Yu | E05B 37/0058 |
| 2024/0352767 | A1 * | 10/2024 | Lai | E05B 67/003 |

FOREIGN PATENT DOCUMENTS

| | | | |
|---|---|---|---|
| CN | 109826499 | A | 5/2019 |
| CN | 109944511 | A | 6/2019 |
| CN | 110685512 | A | 1/2020 |
| CN | 114109155 | A | 3/2022 |
| JP | 5954662 | | 4/1984 |
| JP | 6261292 | | 4/1987 |
| JP | D1254694 | S | 10/2005 |
| KR | 9116962 | | 10/1991 |

OTHER PUBLICATIONS

"Green 3 Digit Combination Padlock" Amazon https://www.amazon.com/Combination-Stainless-Strength-Suitcase-Padlocks/dp/B0CL8PFVS7/ref=pd_ci_mcx_di_int_sccai_cn_d_sccl_2_7/142-2535282-9307525?pd_rd_w=VsLmR&content-id=amzn1.sym.751acc83-5c05-42d0-a15e-303622651e1e&pf_rd_p=751acc83-5c05-42d0-a15e-30 (Year: 2023).*

"Surelock TSA Compatible Travel Luggage Locks, Inspection Indicator Car Lock" IBSPOT. https://ibspot.com/products/sure-lock-tsa-compatible-travel-luggage-locks-inspection-indicator-car-lock-grey (Year: 2024).*

International Search Report issued by the CN National Intellectual Property Administration dated Sep. 29, 2022; 5 pages.

EPO, Extended European Search Report for EP Appl. No. 24169502.2 (Oct. 4, 2024).

* cited by examiner

OBJECT SHAPED COMBINATION PADLOCK

CROSS-REFERENCE TO RELATED APPLICATION

This application claims priority under 35 USC § 119 to U.S. Provisional Application No. 63/296,671 filed on Jan. 5, 2022, which is hereby incorporated by reference in its entirety, and this application is a continuation-in-part of U.S. Design patent application Ser. No. 29/839,385 filed on May 20, 2022, which is hereby incorporated by reference in its entirety.

TECHNICAL FIELD

The present invention relates to combination padlocks.

BACKGROUND OF THE INVENTION

There are several combination padlocks with single or even dual locking mechanisms that are on the current market. However, most of these padlocks are traditionally shaped and have a mechanical combination mechanism such as Mr. Eric Lai's U.S. Pat. Nos. 5,715,709 and 8,261,583. However, none of these existing padlocks show a combination padlock which contains an object shape such as a car. For example, FIGS. 1A-22D of the present invention are related to a car shaped combination padlock with a dual locking mechanism. This new invention improves marketing strategies for example, the car shaped padlock contains a new invented mechanism which has four wheels to be the combination padlock. Instead of a stack of combinations joined together, this new invention creates a new locking construction to make these four combination dials act as car wheels with a different locking mechanism than the prior art. The new invention even contains a new reset mechanism and an internal linkage to prevent lock picking and an improved reset mechanism without easily letter the user accidentally reset the lock in an unintentional manner. Details will be described below.

DETAILED DESCRIPTION (FIGS. 1A-29B)

Part Numbering

Figure 1A:
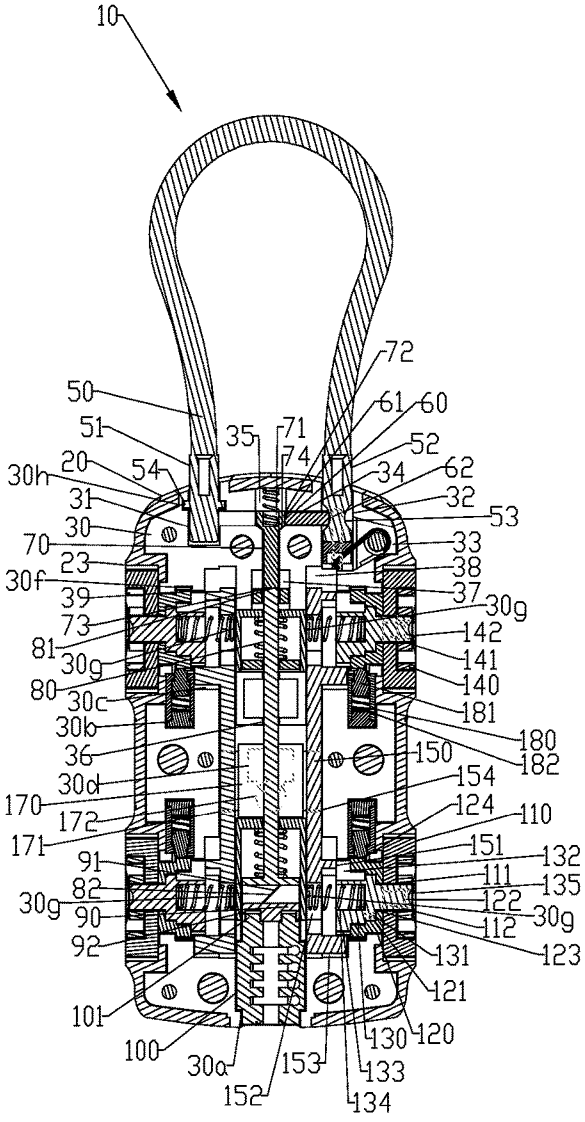
FIG. 1A is a front cross-sectional view of the combination padlock.
Figure 1B:
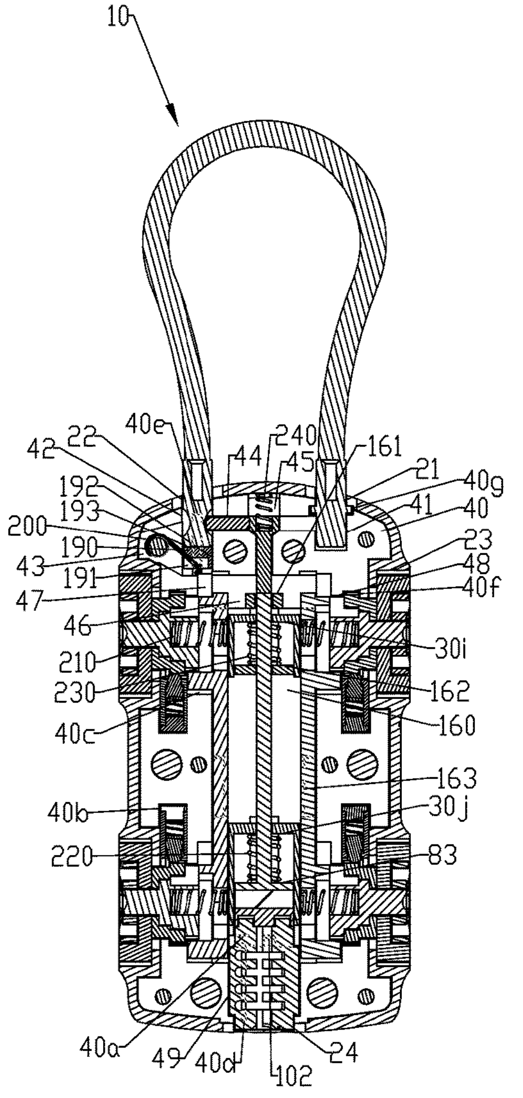
FIG. 1B is a rear cross-sectional view of the combination padlock.

10 Padlock.

20 External-Cover. 21 Fixed-end-hole. 22 Flexible-End-hole. 23 Dial-Cutout.

24 Cylinder-cutout.

30 Base-body. 31 Fixed-end-hole 32 Flexible-end-hole. 33 Torque-Spring-slot.

34 Bolt-slot. 35 Locking-Cam-Slot. 36 Extended-Cam-slot.

37 Connected-Plate-slot. 38 Control-Plate-Slot. 39 Clutch-slot.

30*a* Cylinder-slot. 30*b* Ratchet-pin-slot. 30*c* Extended-Pin-Slot. 30*d* Button-slot.

30*e* Spring-loaded-member-slot. 30*f* Inner-wheel-slot. 30*g* clutch-spring-wall.

30*h* Wing-slot. 30*i* connected-plate-spring-wall. 30*j* extended-cam-spring-wall

40 Interior-Cover. 41 Fixed-end-hole 42 Flexible-end-hole.

43 Torque-Spring-slot 44 Bolt-Slot. 45 Locking-Cam-Slot. 46 Extended-Cam-slot.

47 Control-Plate-Slot 48 Clutch-slot. 49 Cylinder Slot.

40*a* Cylinder-Turning-angle-control-slot. 40*b* Ratchet-pin-slot.

40*c* Extended-Pin-Slot 40*d* Wafer-strengthen-plate-slot.

40*e* Spring-loaded-member-slot. 40*f* Inner-wheel-slot. 40*g* Wing Slot

50 Cable. 51 Fixed-End 52 Flexible-End 53 Bolt-receiving-cutout 54 Wing.

60 Bolt. 61 Flat-end. 62 Round-end

70 Cam. 71 Cam-Spring-hole. 72 Flat-edge. 73 Tail. 74 Slope.

80 Extended-Cam 81 Tail. 82 Slope. 83 wall.

90 Short-Cam. 91 Slope. 92 Holes.

100 Cylinder. 101 Pins. 102 Angle Control-member.

110 Exterior-Dial. 111 Rivet-hole. 112 Reset Hole.

120 Inner-Dial. 121Teeth. 122 Rivet. 123 Reset hole. 124 Ratchet-slot.

130 Clutch. 131 Teeth-slot. 132 True-gate. 133 False-gate. 134 Spring-hole.

135 Reset Button.

140 Wheel-Cover. 141 Reset hole. 142 Rivet-hole

150 Control-Plate. 151 Curved-surface. 152 Clutch-spring-hole.

153 Extended-Pin. 154 Connected-plate-receiving-cutout

160 Connected-Plate. 161 Contact-wall. 162 Spring-wall.

163 Extended-pointer.

170 Button. 171 Extended-wing. 172 Reset-stopper-hole

180 Ratchet-pin-holder 181 Ratchet-pins. 182 Rachet-spring.

190 Spring-load-member. 191 Torque-spring-slot. 192 Surface.

193 Extended-fin.

200 Torque Spring.

210 Clutch Spring.

220 Extended-Cam Spring.

230 Connected-Plate Spring.

240 Cam Spring.

250 Reset Tool.

260 Key.

270 Combined-Dial. 271 Teeth. 272 Reset-hole 273 Ratchet-slot.

280 Rod. 281 Spring-Receive-Cutout. 282 Surface. 283 Extended-fin.

290 Rod-Spring.

Figure 1C:
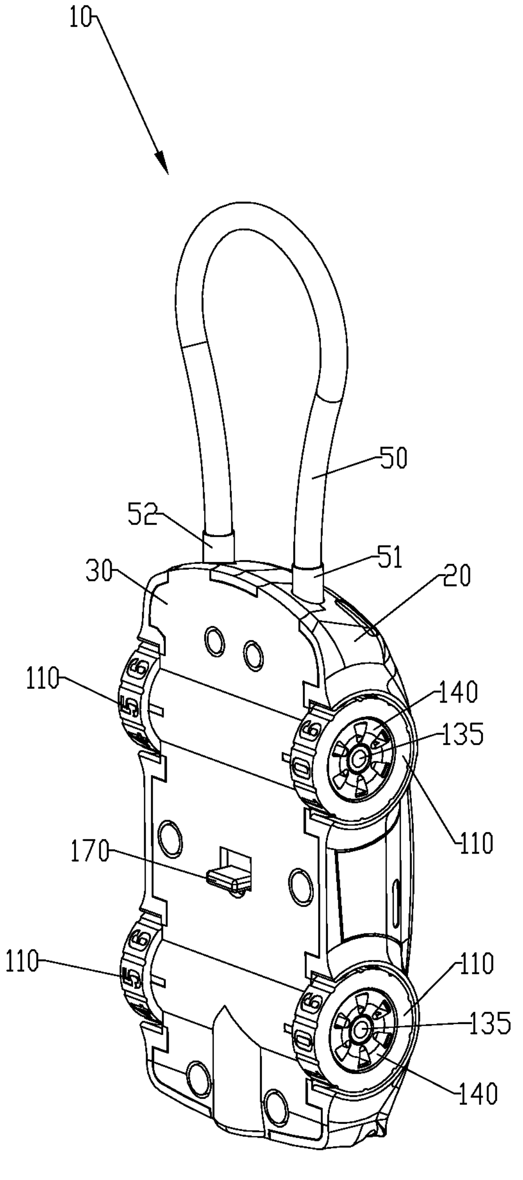
FIG. 1C is a left rear perspective view of the combination padlock.
Figure 1D:
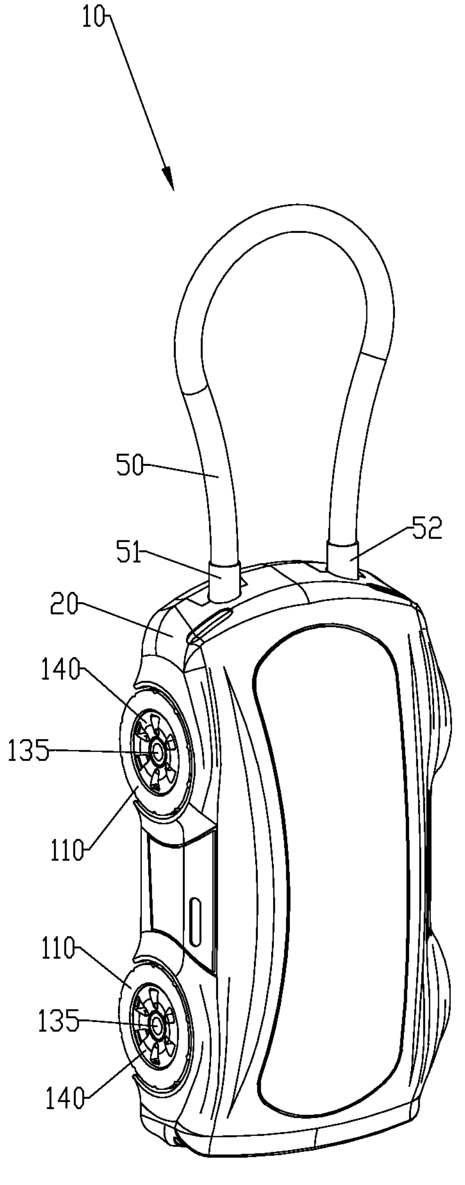
FIG. 1D is a left front perspective view of the combination padlock.
Figure 2:
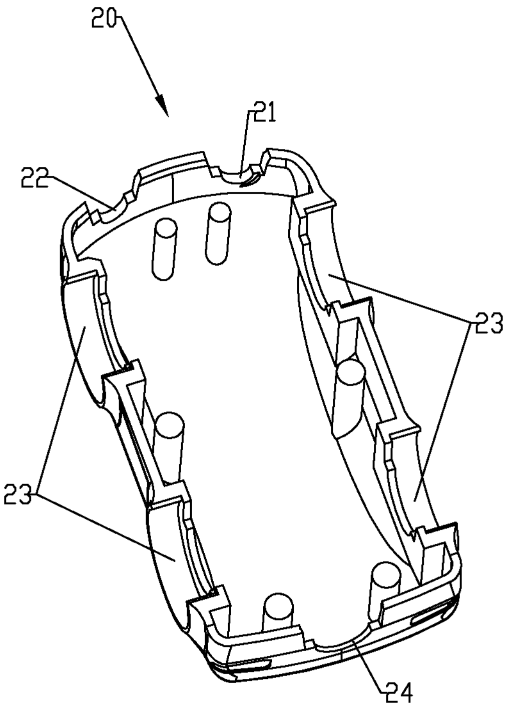
FIG. 2 is a perspective view of the external cover of the combination padlock.
Figure 3:
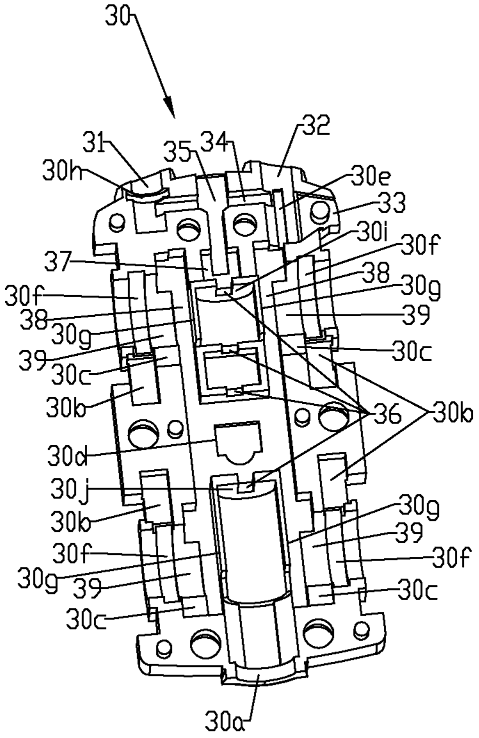
FIG. 3 is a perspective view of the base-body of the combination padlock.
Figure 4:
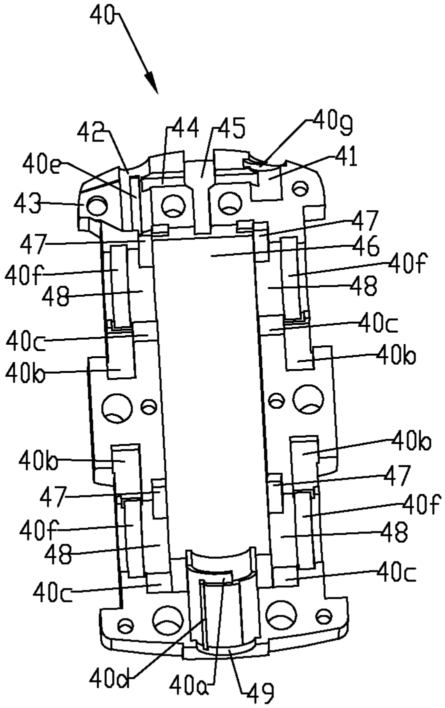
FIG. 4 is a front view of the interior cover of the combination padlock.
Figure 5:
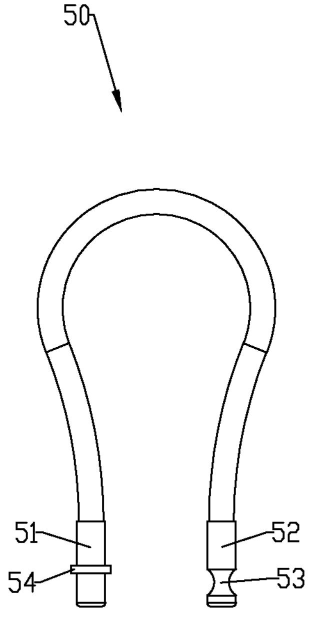
FIG. 5 is a perspective view of the cable of the combination padlock.
Figure 6:
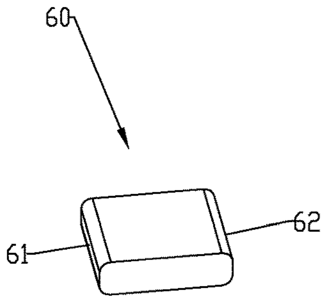
FIG. 6 is a perspective view of the bolt of the combination padlock.
Figure 7:
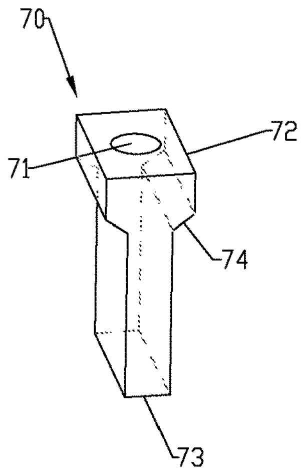
FIG. 7 is a perspective view of the cam of the combination padlock.
Figure 8:
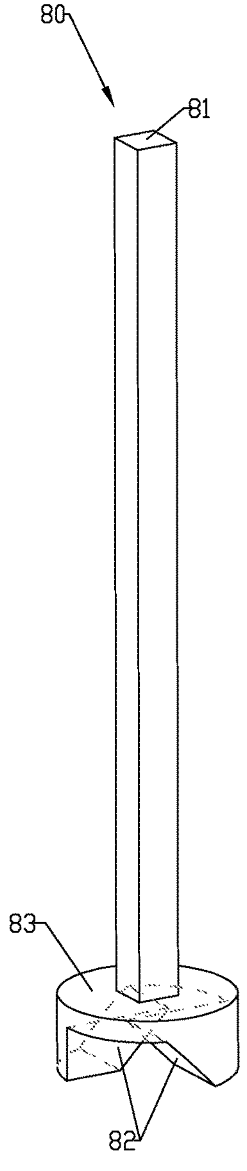
FIG. 8 is a perspective view of the extended cam of the combination padlock.
Figure 9:
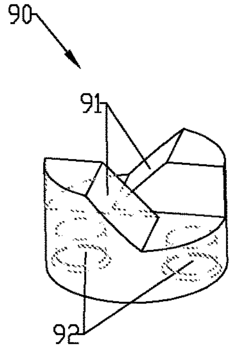
FIG. 9 is a perspective view of the short cam of the combination padlock.
Figure 10:
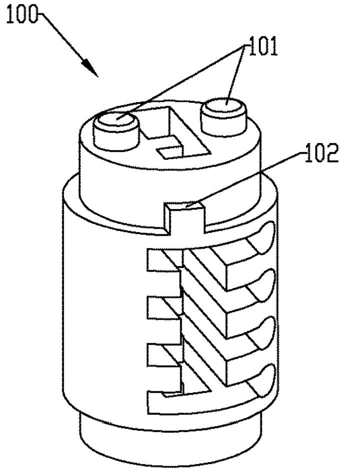
FIG. 10 is a perspective view of the cylinder of the combination padlock.
Figure 11:
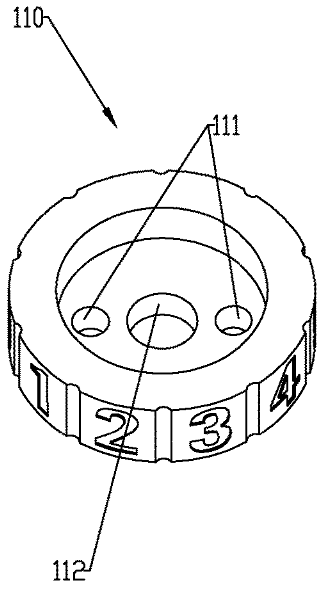
FIG. 11 is a perspective view of the exterior dial of the combination padlock.
Figure 12A:
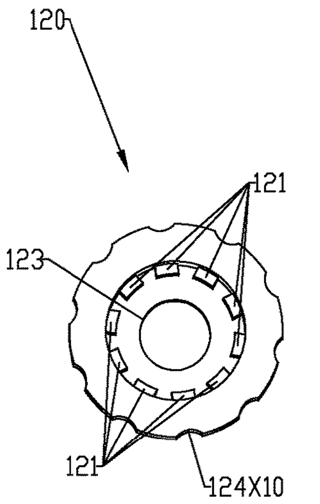
FIG. 12A is a plan view of the inner-dial of the combination padlock.
Figure 12B:
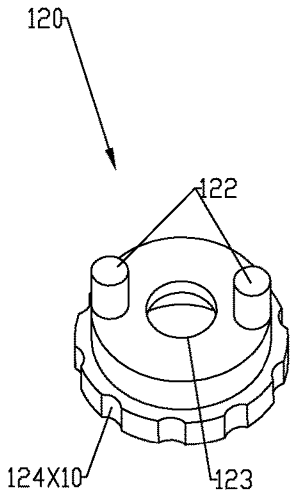
FIG. 12B is a perspective view of the inner-dial of the combination padlock.

Combination Padlock Captures—FIGS. 1C and 1D—(Lock Mode FIGS. 1A-19):

The new invention is a padlock 10 with a car shaped external-cover 20, base-cover 30, and a set of exterior-dials 110 that act as the vehicle tires. In addition, a locking means such as cable 50 with different lock-ends (fixed-end 51 and flexible-end 52) controlled by the mechanical mechanism such as the correct combination code via dial 110 or correct key 260, allows for opening and closing of the object shaped (car shaped) padlock. More than one unlocking feature can be added in such a padlock. The present invention uses a set of exterior-dials 110 which are mounted like a vehicle tire/wheel to form a car shaped locking padlock with physical functionality on the wheels. If at least one exterior-dial 110 is not in the correct code, then the entire locking mechanism cannot be opened via the combination mechanism. If a correct key 260 is not present, then the padlock 10 is also not able to be opened by the incorrect key.

A button 170 demonstrates the opening of the lock correct code of exterior-dial 110. If it is not correct as per FIGS. 1C and 1D, then the padlock cannot be opened.

A wheel cover 140 is mounted in the exterior-dial 110 to serve as a decoration and to cover the internal mechanism of the combination mechanism.

Figure 13A:
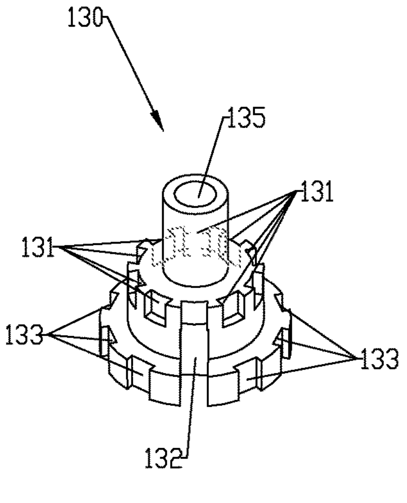
FIG. 13A is a top perspective view of the clutch of the combination padlock.
Figure 13B:
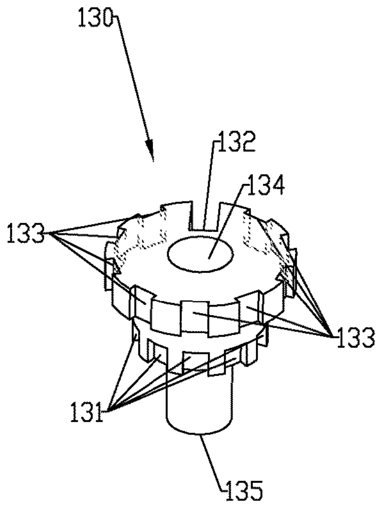
FIG. 13B is a bottom perspective view of the clutch of the combination padlock.
Figure 14:
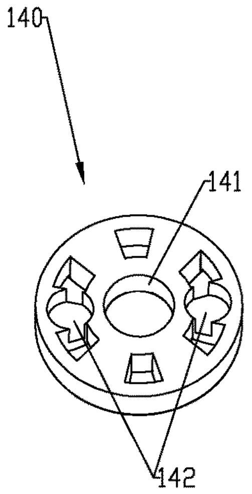
FIG. 14 is a perspective view of the wheel cover of the combination padlock.
Figure 15:
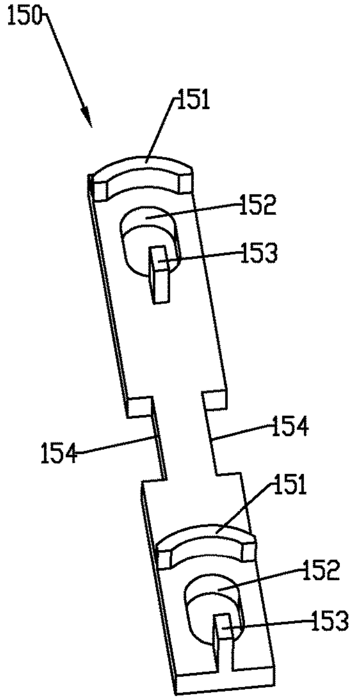
FIG. 15 is a perspective view of the control-plate of the combination padlock.
Figure 16:
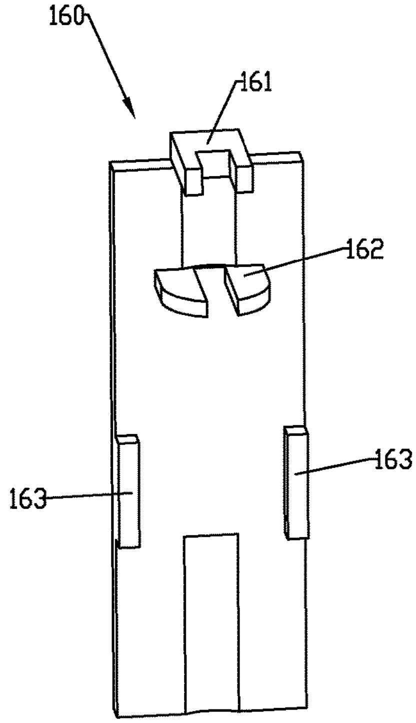
FIG. 16 is a perspective view of the connected-plate of the combination padlock.
Figure 17:
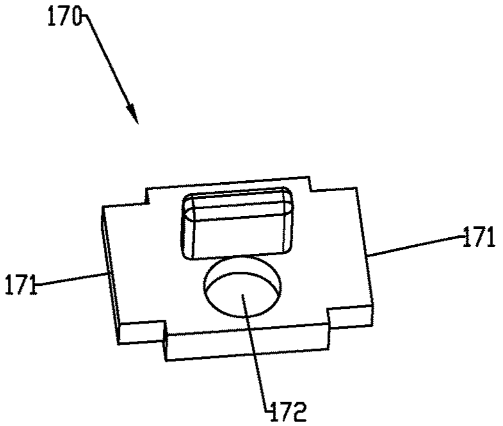
FIG. 17 is a perspective view of the button of the combination padlock.
Figure 18:
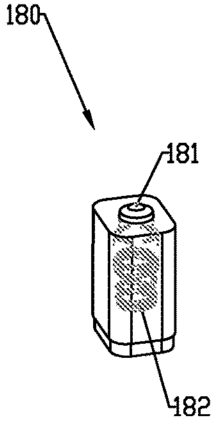
FIG. 18 is a perspective view of the ratchet-pin-holder of the combination padlock.
Figure 19:
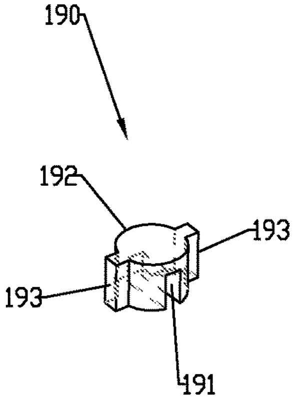
FIG. 19 is a perspective view of the spring-load-member of the combination padlock.
Figure 20A:
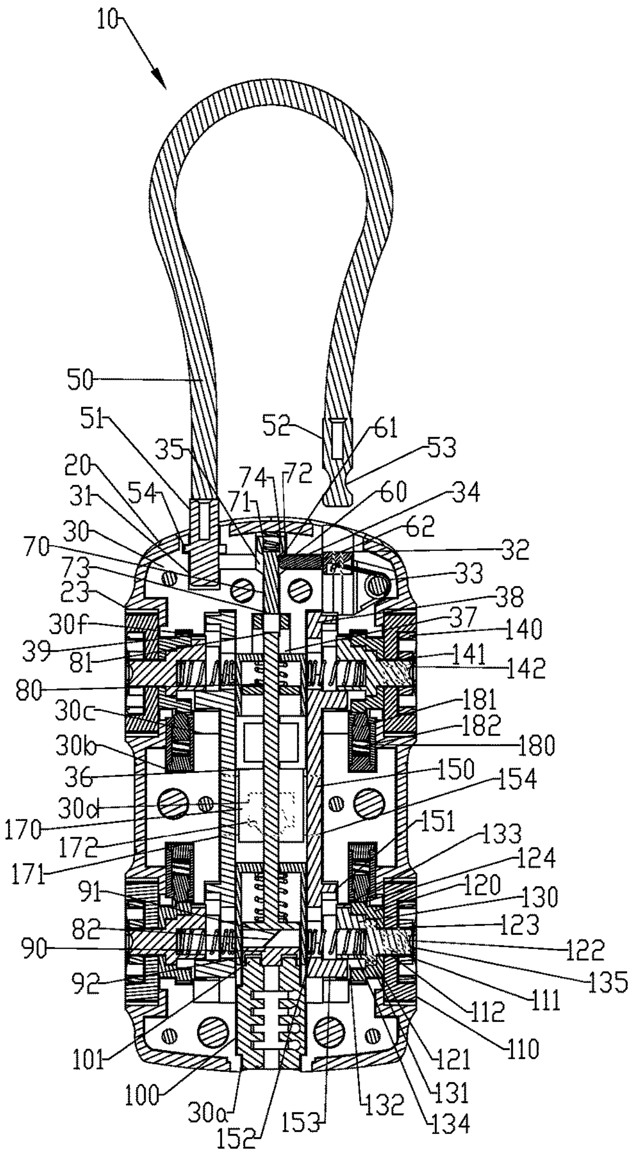
FIG. 20A is a front cross-sectional view of the combination padlock with the flexible end of the cable unlocked (free of base-body).
Figure 20B:
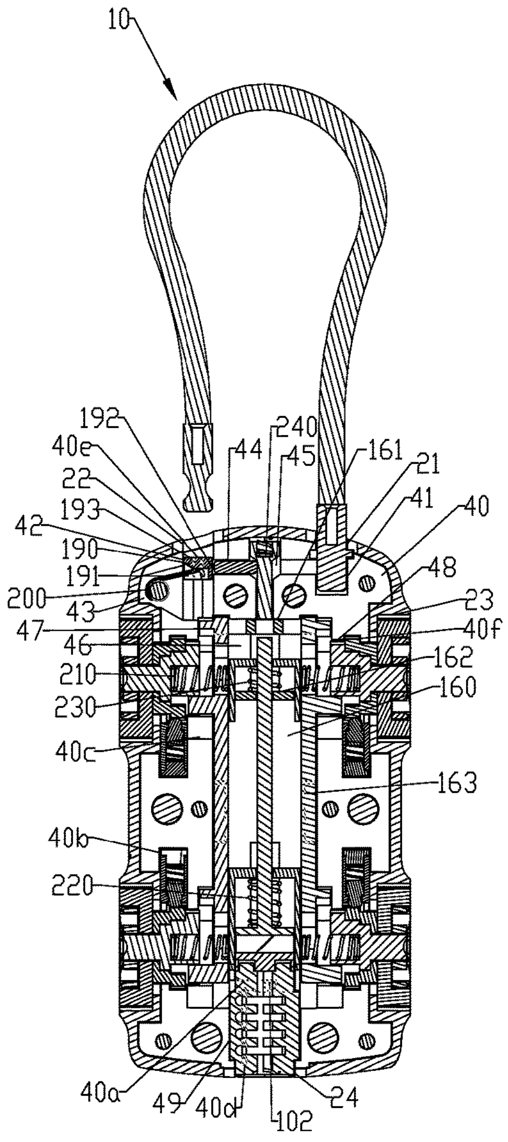
FIG. 20B is a rear cross-sectional view of the combination padlock with the flexible end of the cable unlocked (free of base-body).
Figure 20C:
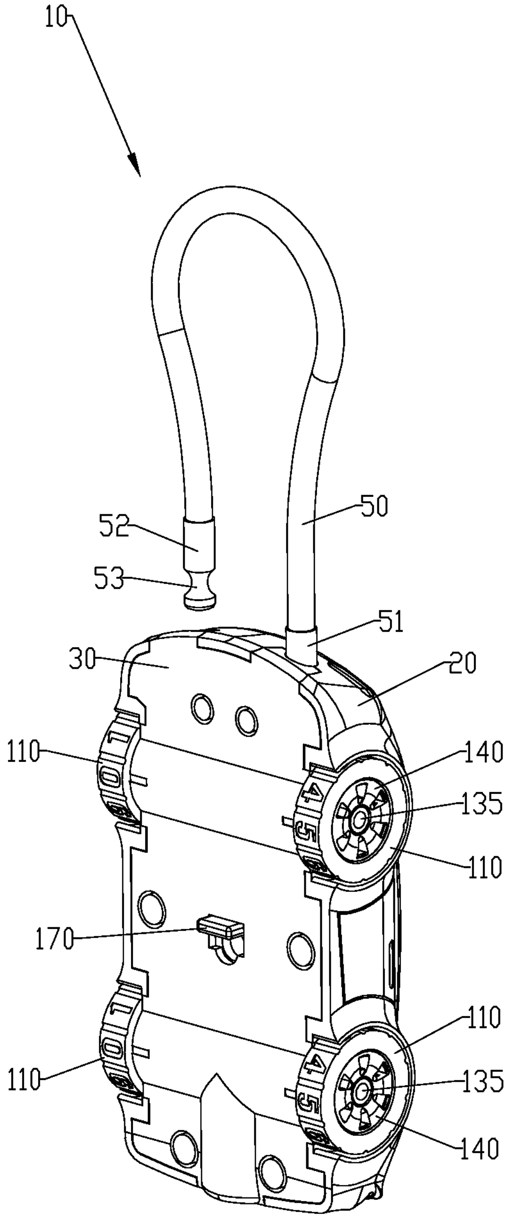
FIG. 20C is a left rear perspective view of the combination padlock with the flexible end of the cable unlocked (free of base-body).
Figure 20D:
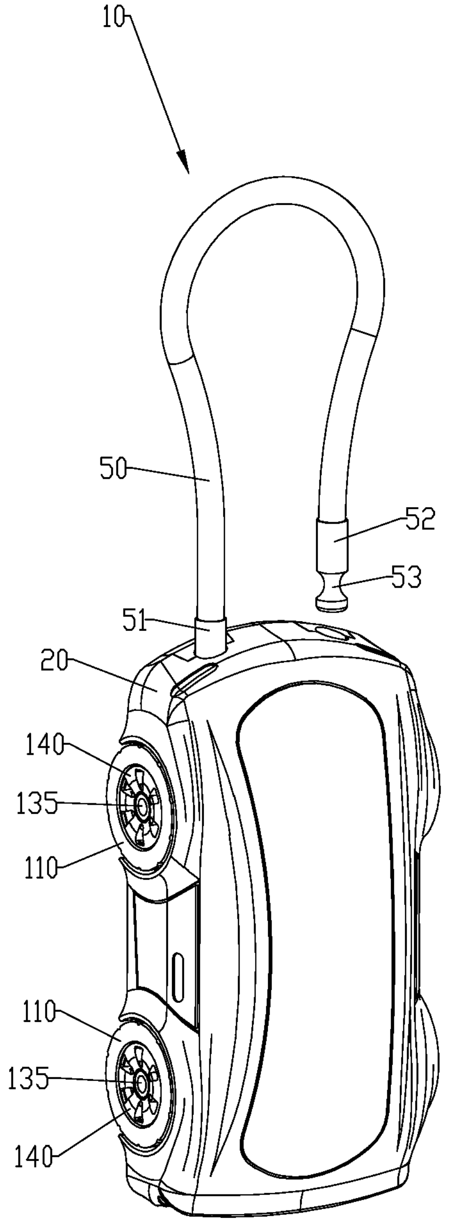
FIG. 20D is a left front perspective view of the combination padlock with the flexible end of the cable unlocked (free of base-body).
Figure 21A:
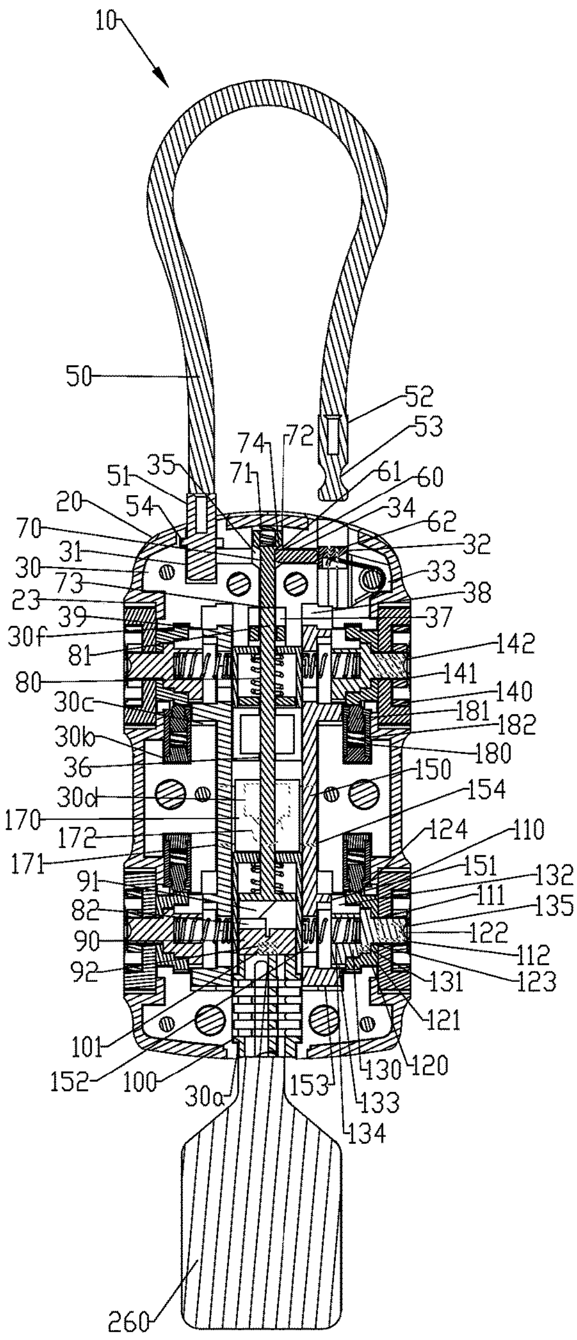
FIG. 21A is a front cross-sectional view of the combination padlock with a key inserted to unlock the cable.
Figure 21B:
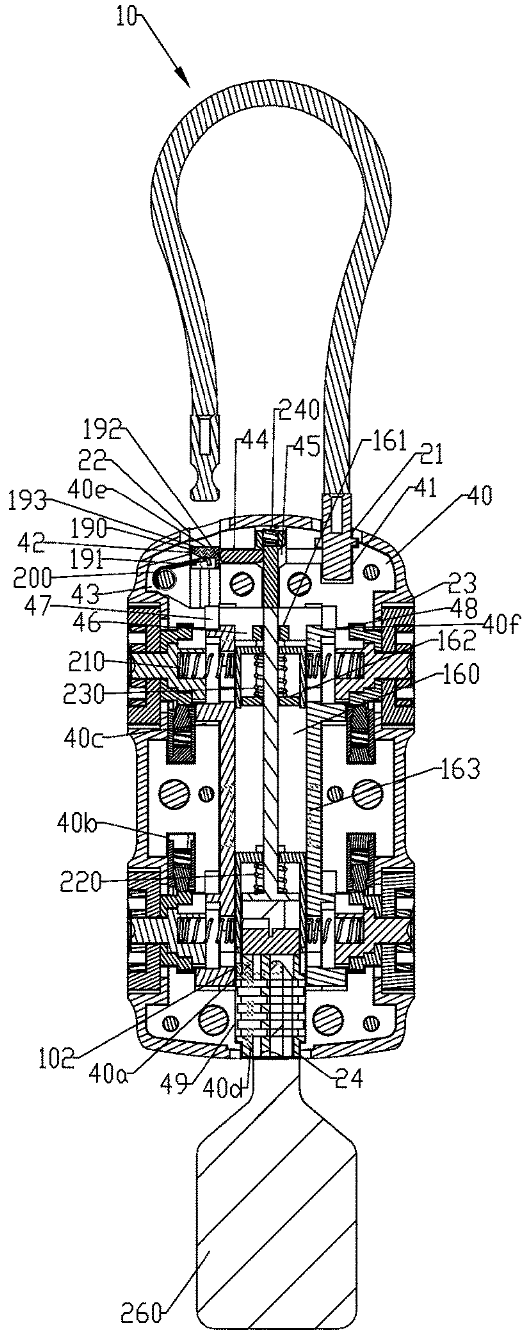
FIG. 21B is a rear cross-sectional view of the combination padlock with a key inserted to unlock the cable.
Figure 21C:
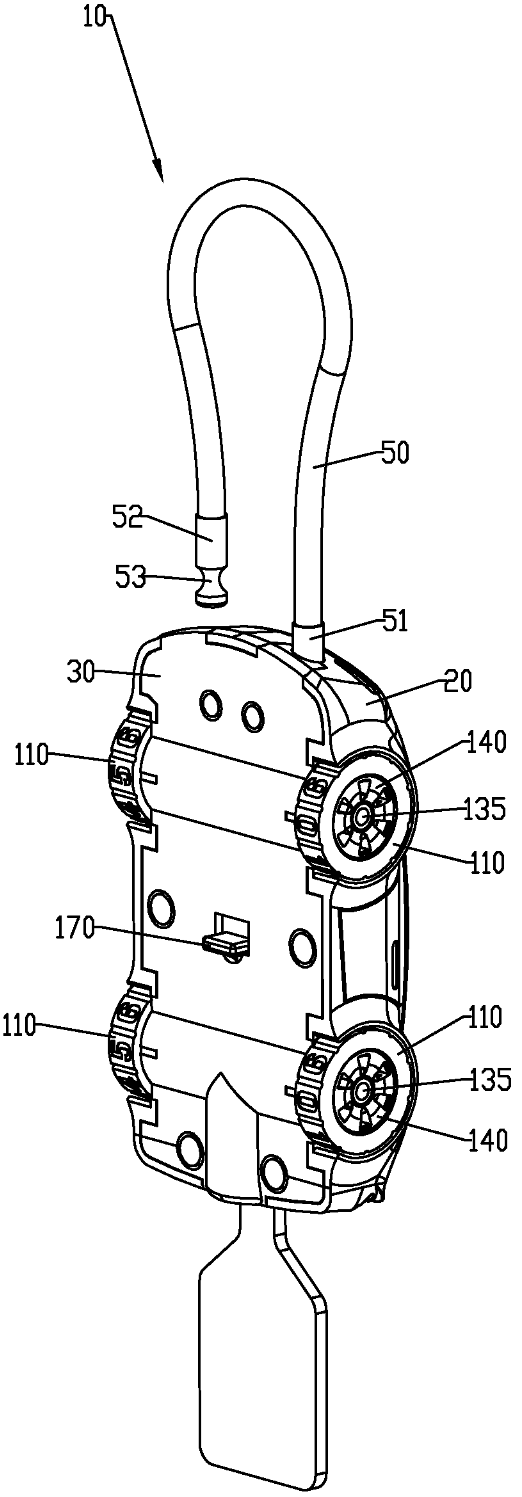
FIG. 21C is a left rear perspective view of the combination padlock with a key inserted to unlock the cable.
Figure 21D:
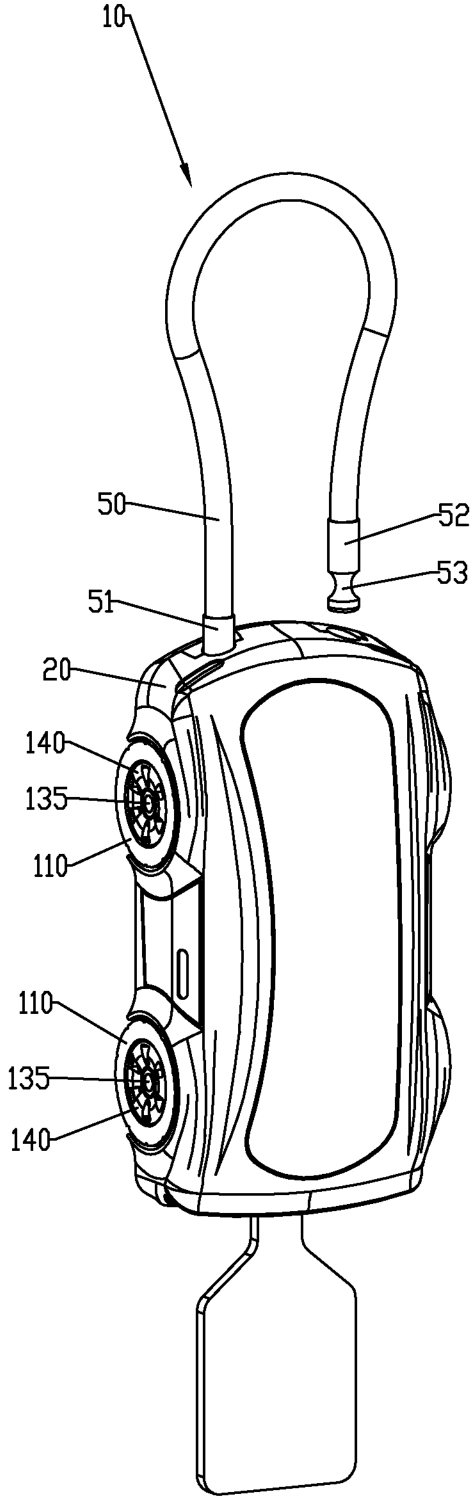
FIG. 21D is a top perspective view of the combination padlock with a key inserted to unlock the cable.
Figure 22A:
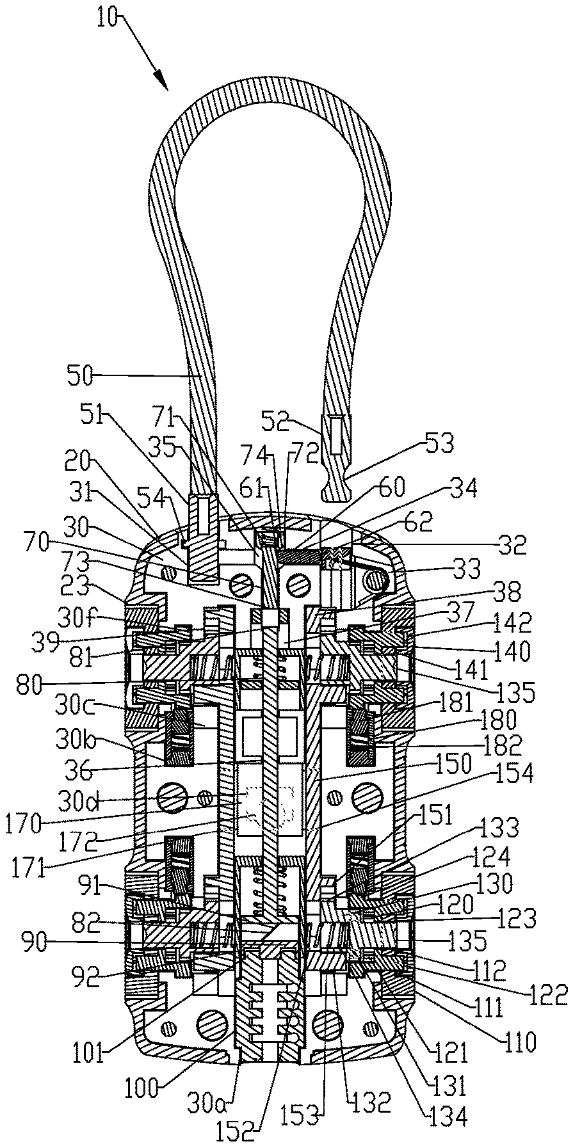
FIG. 22A is a front cross-sectional view of the combination padlock showing the flexible end of the cable free.
Figure 22B:
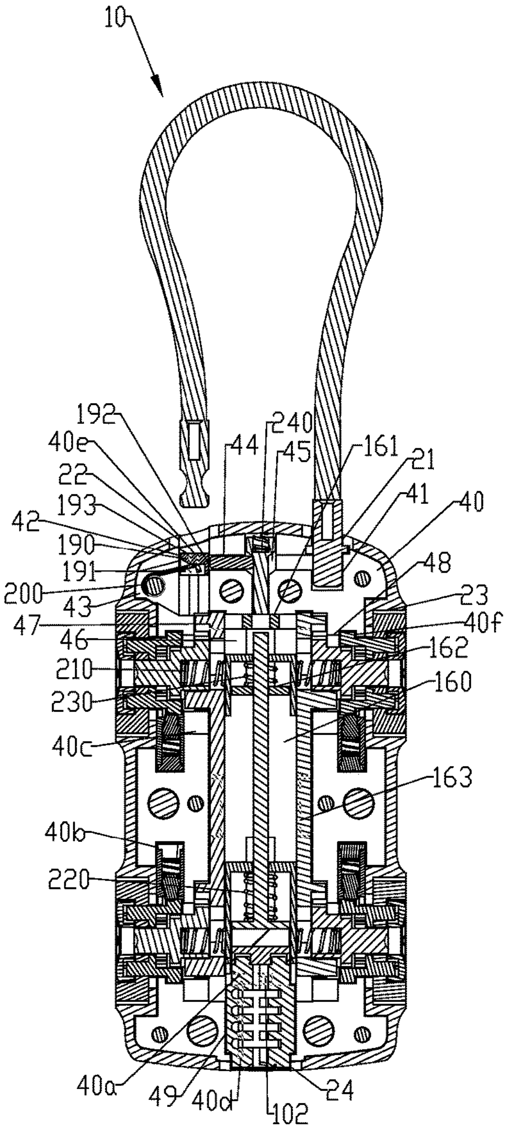
FIG. 22B is a rear cross-sectional view of the combination padlock showing the flexible end of the cable free.
Figure 22C:
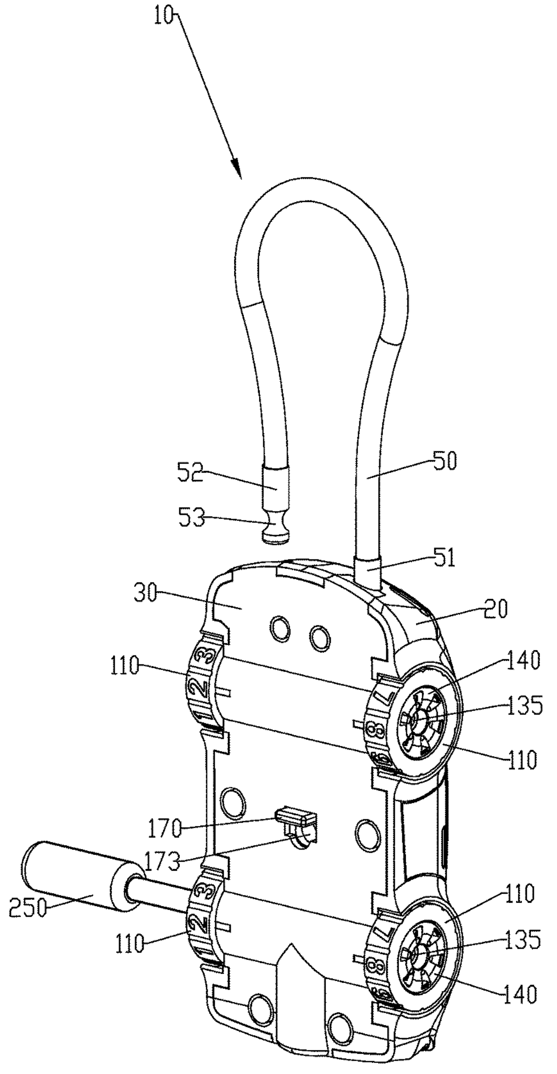
FIG. 22C is a bottom perspective view of the combination padlock with a reset tool inserted into the padlock.
Figure 22D:
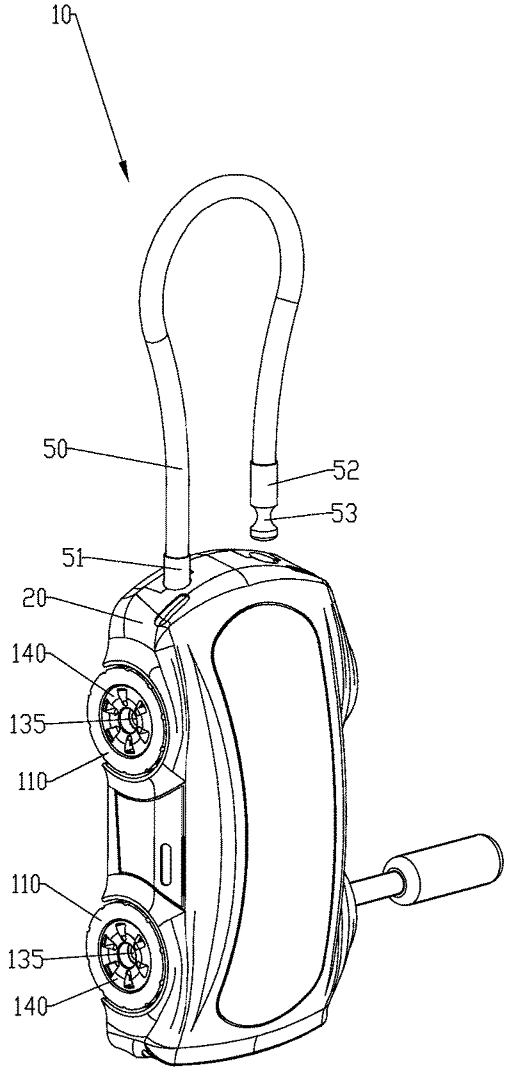
FIG. 22D is a top perspective view of the combination padlock with a reset tool inserted into the padlock.

In FIGS. 1C and 1D, the padlock 10 demonstrates the reset mechanism such as the reset button 135 of the clutch 130 (see FIGS. 13A, 13B).

Combination Mechanism Design and Placement FIGS. 1A-19:

The object-shaped padlock 10 is constructed with a set of exterior-dials 110, such as dials 110 assembled by the inner-dials 120. There is a rivet 122 in the inner-dial 120 which is assembled into the rivet-hole 111 of the exterior-dial 110. Once it is riveted then rotational movement from the exterior-dial 110 will direct transfer to the inner-dial 120. There is a wheel-cover 140 which is assembled to the exterior-dial 110. There is a rivet-hole 142 of the wheel-cover 140 that has a bigger space to cover the rivet 122 and rivet-hole 111 once they are riveted. By doing so, the exterior dials 110 look nice at the exterior, such as shown in FIGS. 1C and 1D without showing the rivet 122 and the rivet-hole 111.

The inner-wheel 120 contains ratchet-slots 124 which receive the ratchet-pins 181 which are held in place in the ratchet-pin-holder 180 with a spring 182 exerting a force to make sure the ratchet-pins 181 will always be in contact with the ratchet-pin slot 124 of the inner-wheel. The ratchet-slot 124 is held in place by an inner-wheel-slot **30*f*/40*f* of the base-body-30/interior-cover 40. Once it is in this position, the riveted exterior-dial 110 and the inner-dial 120 cannot be pulled away from the body and the cover 20/30/40**.

The inner-wheel 120 further contains a set of teeth 121 which engage with the teeth-slot 131 of the clutch 130. The teeth are engaged all the time except in the reset mode. Once the teeth-slot 131 engages with the teeth 121, the rotation of the exterior-dial 110 will transfer to the inner-dial 120, and it will further transfer this rotational movement to the clutch 130. The clutch 130 contains a reset button 135 which travels and passes through the reset holes 123/141/112 of the inner-dial 120/wheel-cover 140/and exterior-dial 110. The clutch 130 contains a true-gate 132 and false gates 133. In the lock mode, when the true gate 132 of the clutch 130 does not align to the extended-fin 153 of the control-plate 150, the control-plate 150 cannot be moved and cannot let the lock change to the open status. In the lock mode, the clutch 130 has been rotated such that the false gate 133 aligns with the extended-fin 153. In this case, the control plate 150 can only move a small distance relative to the false gate area. This creates a faulty signal to an intruder so as not to be able to easily locate the true gate 132 of the clutch 130 to open the lock. The clutch 130 contains an assembled portion in the clutch-slot 39/48 of the base-body 30/interior-cover 40.

The control-plate 150 further comprises a curved-surface 151 which contacts the clutch 130 when the padlock 10 is in the locked mode. The clutch 130 further comprises a spring-hole 134 which lets the clutch spring 210 pass through that lets spring 210 to contact the clutch-spring-wall 30g of the base-body 30. Although the control-plate 150 will be moving around the control-plate-slot 38/47 within the base-body 30 and the interior-cover 40, the shape and design of the clutch-spring-hole 152 is such that the clutch spring 210 will always be pushing the clutch 30 toward the inner-dial 120 so that the teeth-slot 131 of the clutch 130 will always engage with the teeth 121 of the inner-dial 120. The clutch spring 120 will not interfere with the movement of the control-plate 150.

The control-plate 150 also contains at least one connected-plate-receiving-cutout 154 (two cutouts) where one end is connected with the extended-pointer 163 of the connected-plate. The other end of the connected-plate-receiving-cutout 154 is connected to the extended-wing 171 of the button 170. This means that the control-plate 150, the connected-plate 160, and the button 170 are assembled together with the same vertical movement. In this case, the vertical movement of the control-plate 150 is mainly by the alignment of the true gate 132 of the clutch and the extended-pin 153 of the control-plate 150. In the lock mode, since at least the true gate 132 and the extended-pin 153 are not aligned, the control-plate 150 cannot move to the lock open position. Then the control-plate 150, and the contact-wall 161 will remain in the lock position and thus will not push the tail 73 of the cam upward. This means the opening via combination is restricted.

There is a connected-plate spring 230 which is installed in between the spring-wall 162 of the connected-plate 160 and the connected-plate-spring-wall **30*i*. This spring 230 will always push the connected-plate 160/control-plate 150/and the button 170 downward away from the tail 73 of the cam 70**.

There are two control-plates 150 and each control plate 150 looks after the one side set of dials (two dials for this invention). If the padlock contains six wheels, then the control plate 150 can be expanded to have 3 extended-pins 153 and 3 sets of clutch mechanisms on each side.

The cam 70 has a flat-edge 72 which in the lock mode will always align to the flat-end 61 of the bolt 60. The other side round-end 62 of the bolt engages with the bolt-receiving-cutout 53 of the flexible-end 52 of the cable unit 50. Since the control-plate 150 has no movement, then the cam spring 240 will push the cam downward to this lock position. There is a cam-spring-hole 71 to receive the cam spring 240 to let the spring push the cam downward all the time. In additional, there is a wing 54 of the fixed-end 51 of the cable unit 50 placed inside of the wing-slot **30*g*/40*h* of the base-body 30 and interior cover 40. Once this is in place, the fixed-end 51 of the cable 50 cannot move away from the fixed-end-hole 21/31/41 of the external-cover 20/base-body 30/and interior cover 40** in any mode.

In the lock mode, pushing the reset button 135 of the clutch 130 will not lead to the reset mode, since the curved-surface 151 of the control-plate 150 will block the clutch 130 from moving inward.

Key Mechanism Design and Placement FIGS. 1A-19:

A cylinder 100 is placed in the padlock 10. The cylinder may be controlled by a stack of wafers, such that when the correct key 260 is not present, the stack of wafers extending outwards prevent the cylinder from turning and opening the lock. The cylinder 100 contains pins 101 which are assembled to the holes 92 of the short-cam 90. The slope 91 of the short-cam 90 contacts the slope 82 of the extended-cam 80 for lock opening via key mechanism usage. Since there is no rotation of the cylinder 100, the short-cam 90 and the extended-cam 80 will have no movement. As they have no movement, then the cam 70 will have no movement.

There is an extended-cam spring 220 which is installed in between the wall 83 in the extended-cam 80 and the extended-cam-spring-wall 30j of the base body 30. This spring 220 will always push the extended-cam 80 downward such that the tail 81 of the extended-cam 80 will stay away from the tail 73 of the cam 70 in the lock mode. The spring 220 will also make the extended-cam 80 push downward such that the slope 82 of the extended-cam 80 will engage with the slope 91 of the short-cam during in the lock mode.

Unlock by Combination Code (FIGS. 20A-20D):

Since the user can turn the exterior-dials 110, the inner-dials 120 turn in the same manner as previously described so that each rivet 122 is being held in place in the rivet hole 111 of the exterior-dial such that they are assembled together with the same rotational movement. The teeth 121 of the inner-dial 120 engage with the teeth-slot 131 of the clutch 130, and as the inner-dial 120 turns, the clutch 130 will turn in the same manner. As the clutch 130 turns in the same manner, the user can turn the exterior-dial 110/inner dial 120 and the clutch 130 such that the true-gate 132 of the clutch 130 aligns with the extended-pin 153 of the control-plate to the lock open mode via combination code position. As they align, the user can push the button 170 such that the extended-pin 153 of the control-plate 150 will be able to move upward into the true-gate 132 of the clutch 130. The extended-wing 171 of the button 170 is assembled to one of the connected-plate-receiving-cutouts 154 of the control-plate 150. Therefore, when all of the true gates 132 of the clutch 130 align with the extended-pins 153 of the control-plate 150, the button 170 can push upward to let the extended-pins 153 enter and move inward to the true-gate 132 of the clutch 130.

The other end of the connected-plate-receiving-cutout 154 is linked to the extended-pointer 163 of the connected-plate 160. As the button 170 is being pushed upward, so will the control-plate 150 and connected-plate 160. As the connected-plate 160 moves upward, the contact-wall 161 will contact the tail 73 of the cam 70 to drive the cam upward. A torque spring 200 is assembled in between the torque-spring-slot 33/43 of the base body 30/ interior-cover 40 and the torque-spring-slot 191 of the spring-load-member 190. As the cam 70 moves upward, the torque spring 200 will drive the spring-load-member 190 upward. As the spring-load-member 190 moves upward and the cam is being push upward, the round-end 62 of the bolt 60 will move leftward such that the round-end 62 of the bolt will disengage away from the of the bolt-receiving-cutout 53 of the cable 50. The flexible-end 52 of the cable will pop out of the flexible-end-hole 22/32/42 of the external-cover 20/base-body 30 and interior-cover 40.

The spring-load-member 190 contains an extended-fin 193 which is assembled inside of the spring-loaded-member-slot 30e/40e of the base-body 30 and interior-cover 40. This causes the extended-fin 193 spring-load-member 190 to move within the slots 30*e*/40*e*.

The round-end 62 of the bolt contacts the surface 192 of the spring-load-member 190 and the flat-end 61 of the bolt 60 is placed under the slope 74 of the cam 70 in the lock open mode via combination dials.

Meanwhile, as the button 170 is being pushed upward to open the lock via combination dials, two things could happen:

1. Jumping to reset mode described in reset mode section.
2. The user releases the push button, then the connected-plate-spring 230 will push the connected-plate downward such that the connected-plate 160, button 170, and the control-plate 150 will all be pushed downward as they are interconnected. The connected-plate-spring 230 is assembled in between the connected-plate-spring-wall 30*i* base-body 30 and the spring-wall 162 of the connected-plate 160. As the user releases the button 170, the spring will push the connected-plate downward. Although, the connected-plate 160 is being pushed downward, the flat-end 61 of the bolt 60 is being engaged underneath the slope 74 of the cam 70. Then the cam 70 will stay in the lock open position. Meanwhile, the extended-pin 153 of the control-plate 150 will disengage away from the true-gate 132 of the clutch 130. As it disengages, then the user can rotate the exterior-dials 110 and it will rotate the inner-dial 120 and the clutch 130. As these parts are being rotated, the true-gate 132 of the clutch 130 leaves the cam 70 in the lock open stage. This will cause the lock to be in the open mode, but as the exterior-dials rotate then it will show with a non-open code such that any intruder will not be able to peek the correct code from the lock opening mode, thus providing for better security.

As the button 170/ connected-plate 160/control-plate 150 falls downward, the curved-surface 151 will be blocking the clutch 130 and thus moving toward the reset position. This means that the user cannot push the reset button 135 of the clutch 130 to the reset position.

For the key mechanism, if the cylinder 100 does not have the correct key 260, then the cylinder does not rotate. As the cylinder does not rotate, the short-cam 90 and extended-cam 80 remain silent. The extended-cam spring 220 will tightly push the wall 83 of the extended-cam 80 toward the short-cam 90 and the cylinder 100. There is no action by these components during the entire lock open mode via combination dials.

To relock, the user can push the flexible-end 52 of the cable 50 into the flexible-end-hole 22/32/42 of the external-cover 20/ base-body 30/ interior-cover 40. Then the flexible-end 52 will push the spring-load-member 190 downward such that the bolt-receiving-cutout 53 aligns with the round-end 62 of the bolt 50. As they align then the cam spring 240 will push the cam 70 downward such that the slope 74 of the cam 70 will push the flat-end 61 of the bolt rightward such that the round-end 62 of the bolt will engage back to the bolt-receiving-cutout 53 of the cable 50. As they engage, the flat-end 61 of the bolt 60 will contact flat-edge 72 of the cam 70, and it will further confirm the engagement of the bolt-receiving-cutout 53 of the cable 50 and the round-end 62 of the bolt 60. The user can now scramble the exterior-dials 110 or readvance scramble the exterior-dials 110 as mentioned above once the button 170 is released.

Unlock by Key User (FIGS. 21A-21D):

When correct key 260 is inserted into the cylinder 100, the user can turn the cylinder 100. The pins 101 of the cylinder 100 are assembled with the holes 92 of the short-cam 90. As the cylinder 100 turns, the short-cam 90 turns in the same manner. As the short-cam 90 turns, the slope 91 of the short-cam 90 will drive the slope 82 of the extended-cam 80 upward in the same manner. The extended-cam 80 is placed inside of the extended-cam-slot 36 of the base-body 30. The slot 36 will prevent the extended-cam 80 from any rotational movement as the tail 81 of the extended-cam 80 is shaped like a square with the slot 36 also in a square shape which will prevent the extended-cam 80 from rotational movement. Therefore, as the slope 91 of the short-cam 90 turns, it only drives the slope 82 of the extended-cam 80 upward. As the extended-cam 80 moves upward, the tail 81 will contact the tail 73 of the cam 70 upward.

As the cam 70 moves upward, the torque spring 200 will drive the spring-load-member 190 upward. As the spring-load-member 190 moves upward and the cam is being push upward, the round-end 62 of the bolt 60 will be forced to move leftward such that the round-end 62 of the bolt will disengage away from the of the bolt-receiving-cutout 53 of the cable 50. The flexible-end 52 of the cable will pop out of the flexible-end-hole 22/32/42 of the external-cover 20/base-body 30 and the interior-cover 40.

The spring-load-member 190 contains an extended-fin 193 which is assembled inside of the spring-loaded-member-slot 30e/40e of the base-body 30 and interior-cover 40. This will cause movement of the extended-fin 193 spring-load-member 190 to move within the slots 30*e*/40*e*.

The round-end 62 of the bolt will contact the surface 192 of the spring-load-member 190 and the flat-end 61 of the bolt 60 will be placed under the slope 74 of the cam 70.

The key unlocking user does not have to touch or activate the following components to open the lock via key 260: the exterior-dial 110, the inner-dial 120, clutch 130, control-plate 150, connected-plate 160, and button 170. These components remain silent in the entire open via key mode.

The user can keep on rotating the cylinder with a degree control by the angle-control-member 102 of the cylinder 100 and the cylinder-turning-angle-control-slot 40*a*.

Once it is opened via key mode, the key user can withdraw the key away from the cylinder 100 and the extended-cam spring 220 assembled in between the extended-cam-spring-wall 30*j* and the wall 83 of the extended-cam 80 so as to push the extended-cam 80 downward back to the lock position leaving the cam 70 in the lock open mode. The slope 82 of the extended-cam moves downward so as to rotate the slope 91 of the short-cam 90 back to the lock mode. This will cause the padlock to have the key-non-captive design such that the key is no longer captive in the lock during the entire unlock via key mode.

To relock: the user pushes the flexible-end 52 of the cable 50 into the flexible-end-hole 22/32/42 of the external-cover 20/base-body 30/interior-cover 40. Then the flexible-end 52 will push the spring-load-member 190 downward such that the bolt-receiving-cutout 53 will align with the round-end 62 of the bolt 50. As they align, the cam spring 240 will push the cam 70 downward such that the slope 74 of the cam 70 will push the flat-end 61 of the bolt rightward such that the round-end 62 of the bolt will engage back to the bolt-receiving-cutout 53 of the cable 50. As they engage, the flat-end 61 of the bolt 60 will contact flat-edge 72 of the cam 70, and it will further confirm the engagement of the bolt-receiving-cutout 53 of the cable 50 and the round-end 62 of the bolt 60.

As the cam 70 is pushed downward, the tail 73 of the cam 70 will now travel back to the lock mode position ready for unlock via key mode.

Reset Combination Code (FIGS. 22A-22D):

To reset the combination code, the lock must be in combination lock open code as per lock open via combination. As the combination user pushes the button 170 upward in the lock open mode, the user can keep holding the button 170 and stick a screwdriver or an object into the reset-stopper-hole 172 of the button 170 such that the button 170 will not fall back downward.

As the button 170/ connected-plate 160/control-plate 150 continues in this upward position, the curved-surface 151 will not block the clutch 130 to move toward the reset position. The extended-pin 153 of the control-plate 150 will always engage with the true-gate 132 of the clutch 130 in the reset mode. As the true-gate 132 has a length longer than the other gates, the extended-pin 153 engages with the reset mode all the time. As the true-gate 132 of the clutch 130 engages with the extended-pin 153, the clutch 130 will not be able to rotate during the entire reset mode.

The user can use a reset tool 250 (see FIGS. 22C, 22D) to push the reset button 135 of the clutch 130 inward. As the clutch moves inward, the teeth-slot 131 of the clutch 130 will move away from the teeth 121 of the inner-dial 120.

While the reset button is pushed inward, the user can rotate the exterior-dials 110 and the inner-dials 120 so as to rotate in the same manner. Once the user sets the new combination code, the user can remove the reset tool 250 and the clutch spring 210 will exert a force such that the teeth-slot 131 of the clutch 130 will engage back to the teeth 121 of the inner-dial 120. If all dials are in the new code, the user could further remove the object which is inserted in the reset-stopper-hole 172 of the button 170 such that button 170 will fall back down. As the button 170 moves downward, the control-plate 150 will move downward and the extended-pin 153 will move away from the true-gate 132.

The user can scramble the dials to relock and the lock is set to use the new code.

Figure 23A:
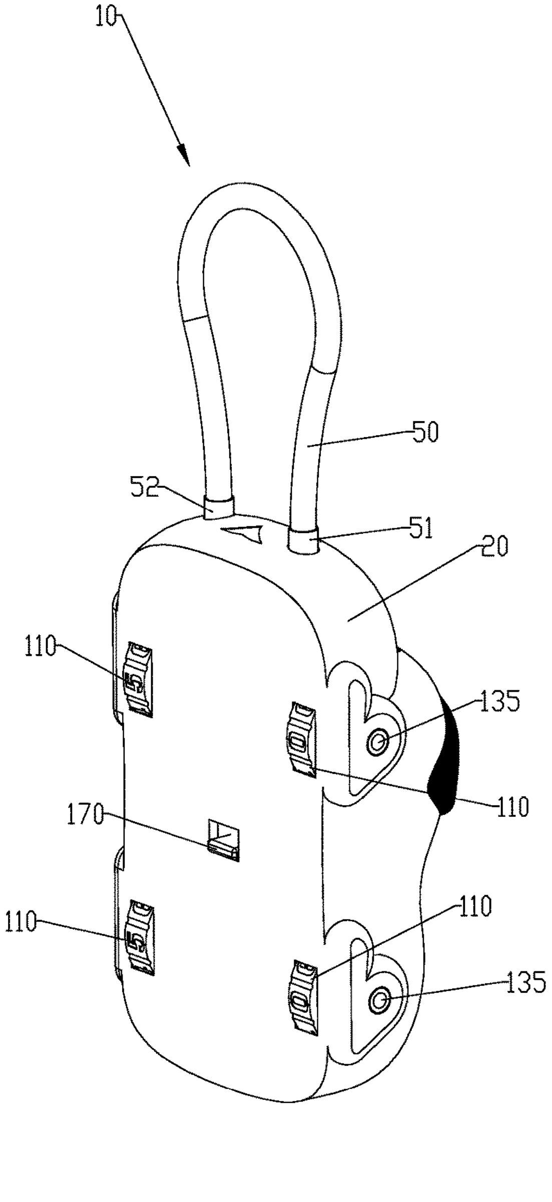
FIG. 23A is a bottom perspective view of a second embodiment of the combination padlock depicting an animal such as a dog.
Figure 23B:
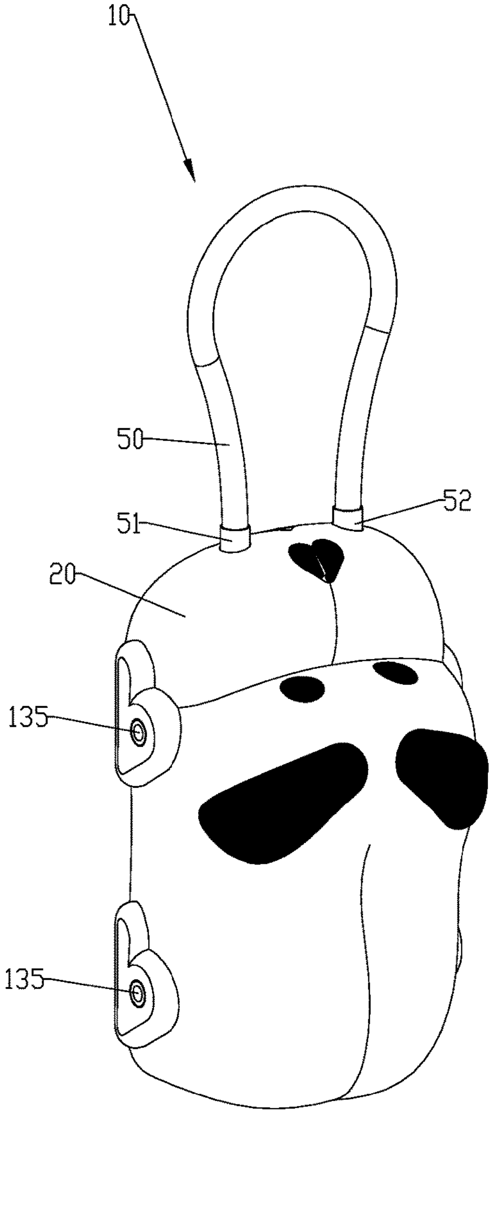
FIG. 23B is a top perspective view of a second embodiment of the combination padlock depicting an animal such as a dog.

Second Embodiment FIGS. 23A-23B

The object lock need not be a car but can also be another object, such as an animal, for example, a dog as shown in FIGS. 23A-23B. The lock combination mode/ key mode/ reset mode will be similar as above mentioned.

Figure 24A:
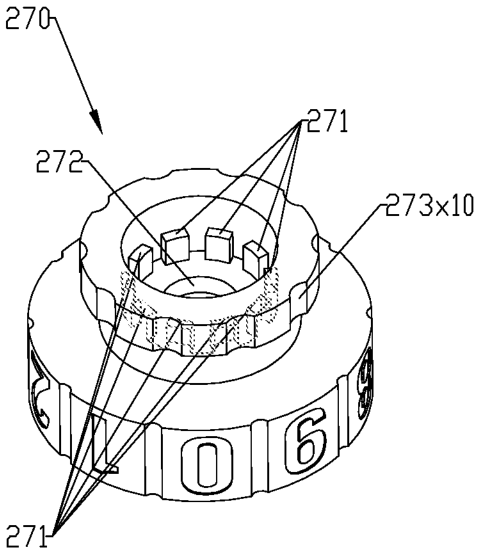
FIG. 24A is a top perspective view of a second embodiment of a combined-dial of the combination padlock.
Figure 24B:
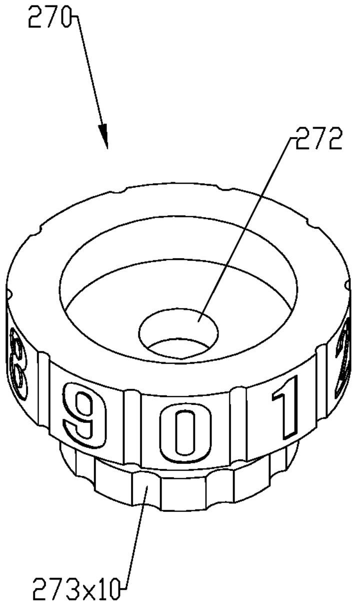
FIG. 24B is a bottom perspective view of a second embodiment of a combined-dial of the combination padlock.
Figure 25:
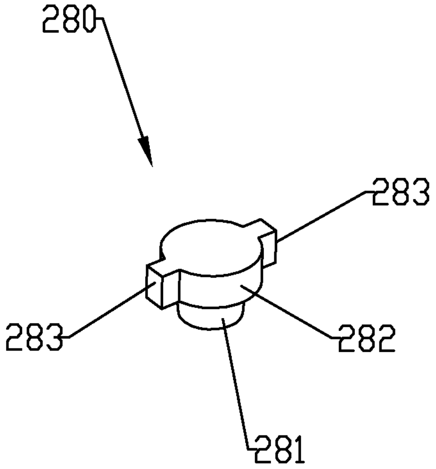
FIG. 25 is a perspective view of a rod of a third embodiment of the combination padlock, where the rod is a replacement of the spring-load member.
Figure 26A:
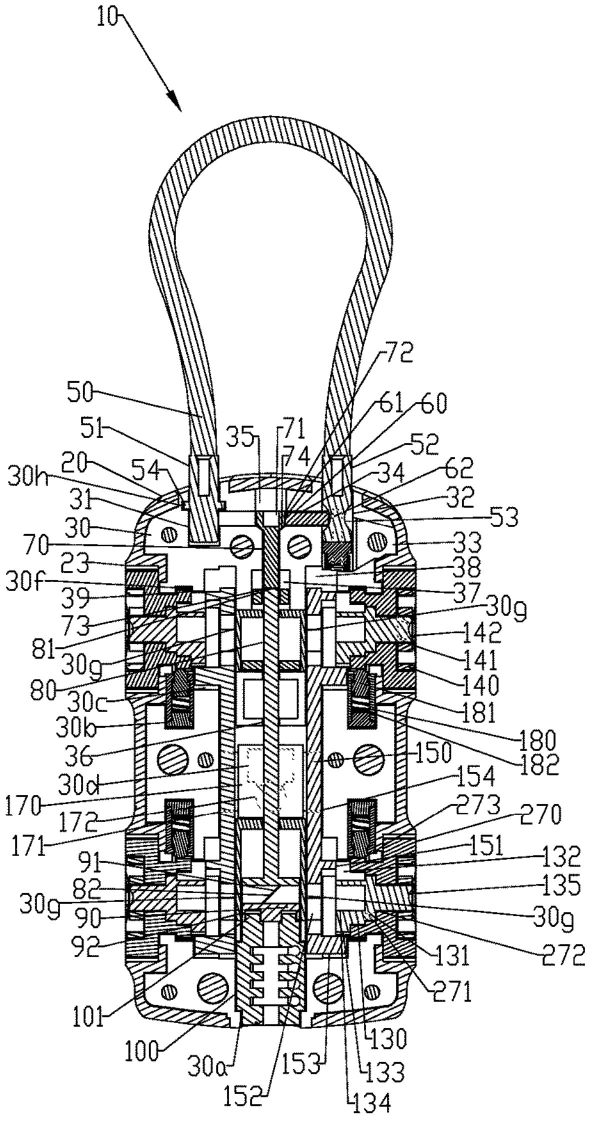
FIG. 26A is a front cross-sectional view of the third embodiment of the combination padlock.
Figure 26B:
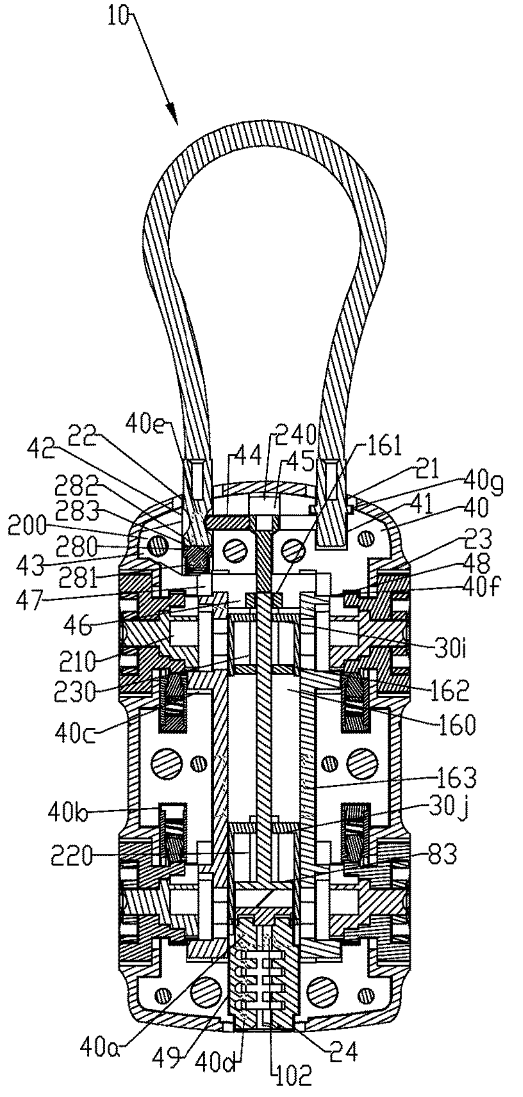
FIG. 26B is a rear cross-sectional view of the third embodiment of the combination padlock.
Figure 27A:
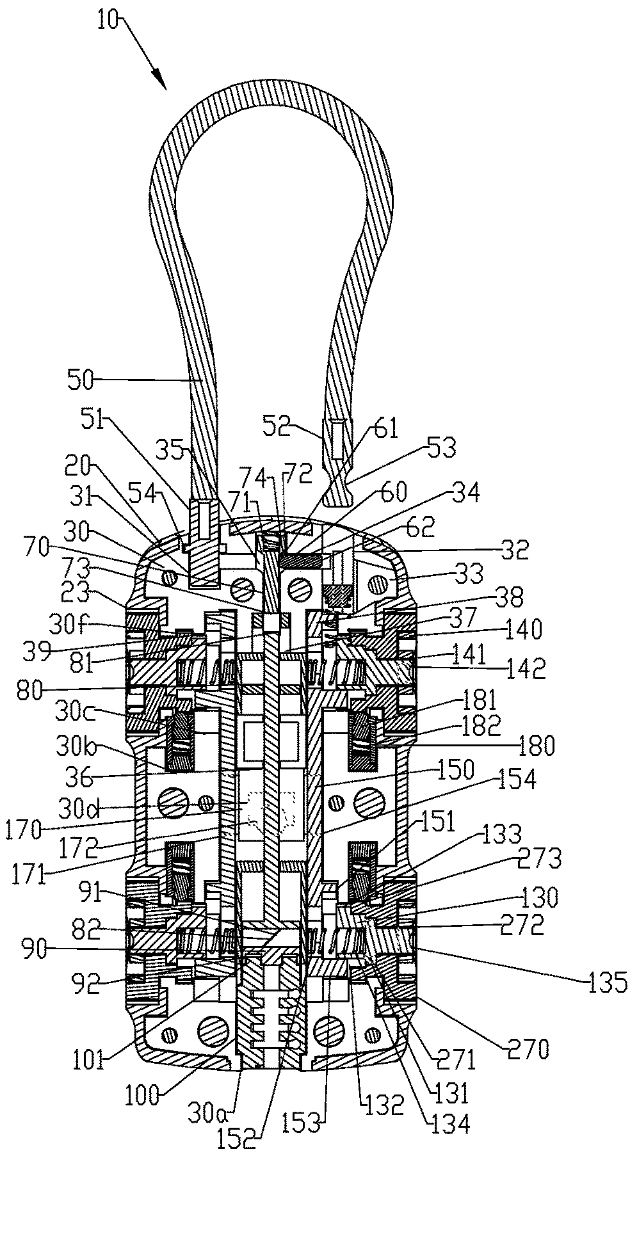
FIG. 27A is a front cross-sectional view of the third embodiment of the combination padlock with the flexible end of the cable free.
Figure 27B:
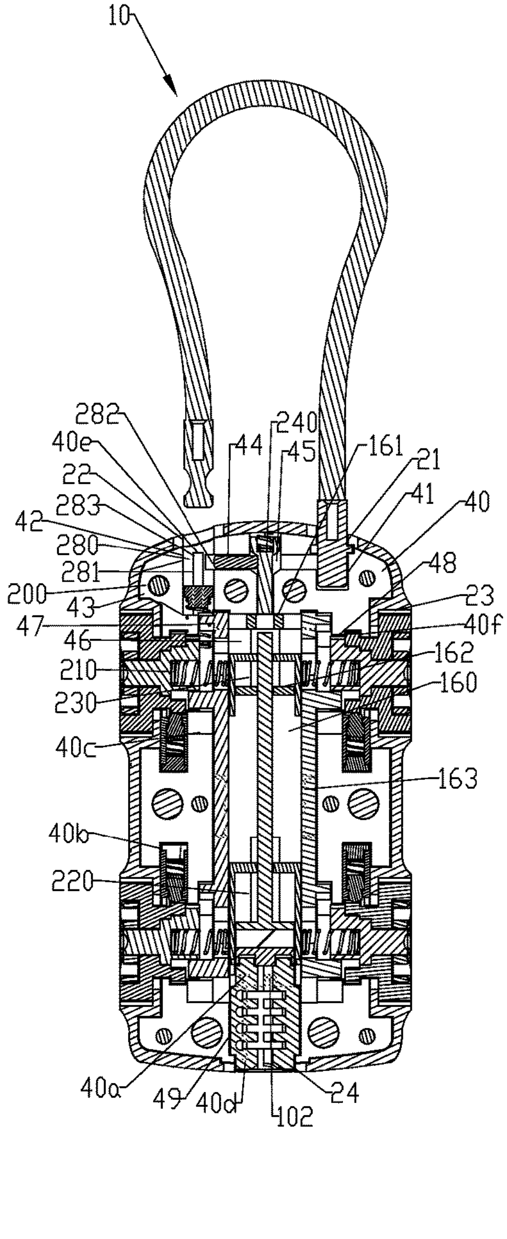
FIG. 27B is a rear cross-sectional view of the third embodiment of the combination padlock with the flexible end of the cable free.
Figure 28A:
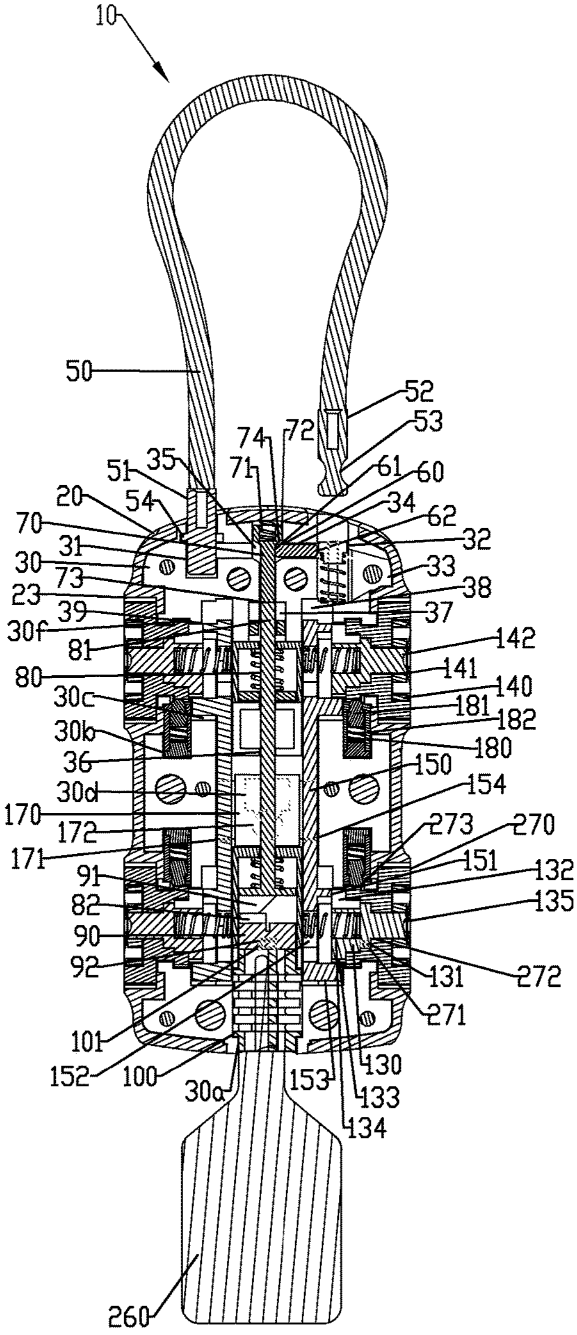
FIG. 28A is a front cross-sectional view of the third embodiment of the combination padlock with a key inserted to unlock the cable.
Figure 28B:
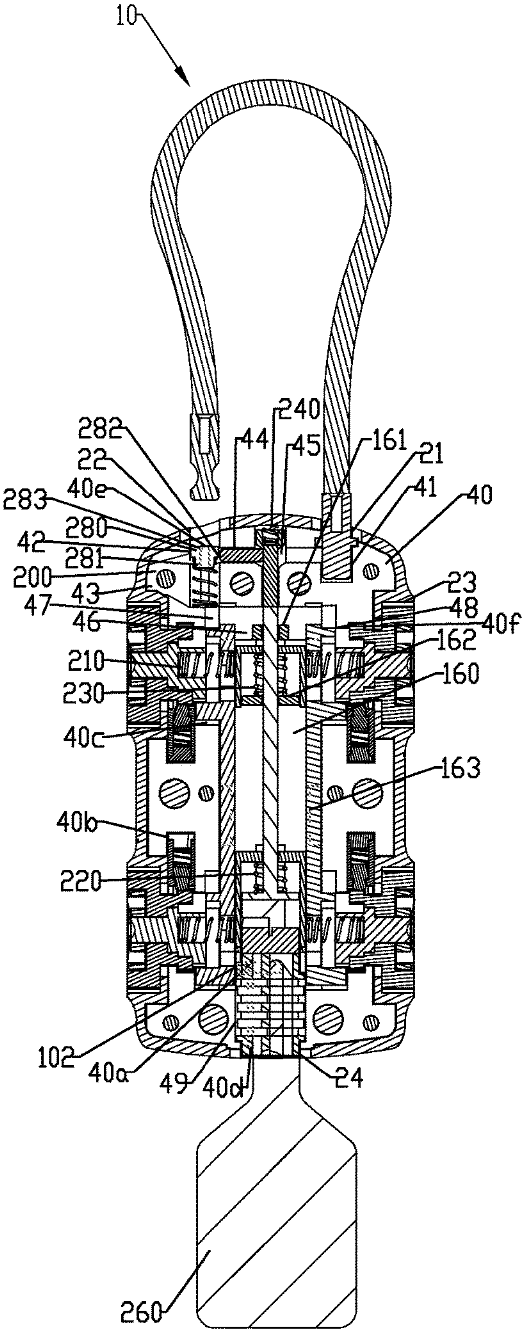
FIG. 28B is a rear cross-sectional view of the third embodiment of the combination padlock with a key inserted to unlock the cable.
Figure 29A:
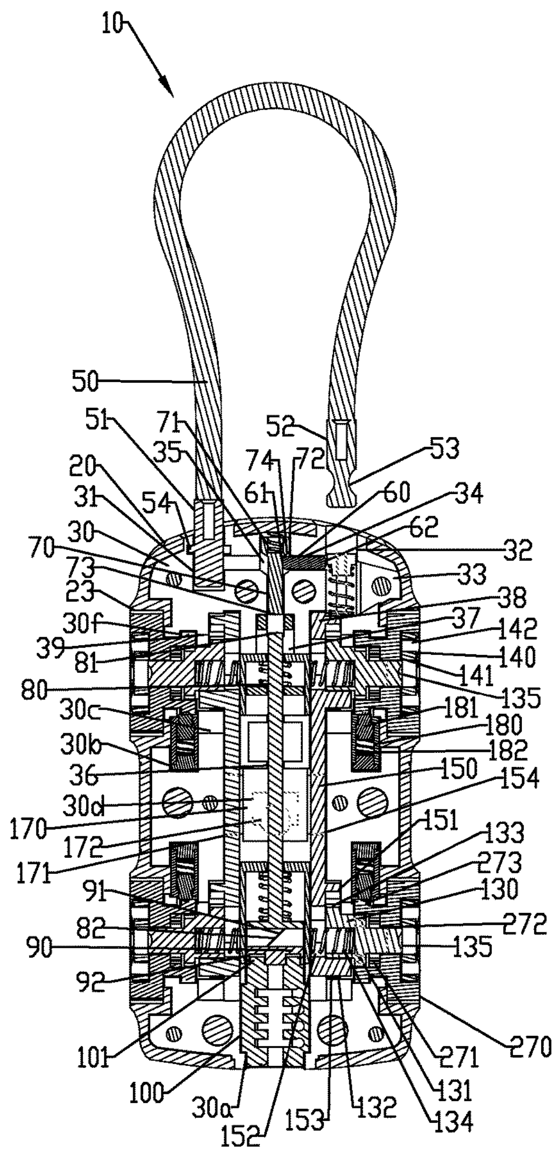
FIG. 29A is a front cross-sectional view of the third embodiment of the combination padlock with the key removed after unlocking the padlock.
Figure 29B:
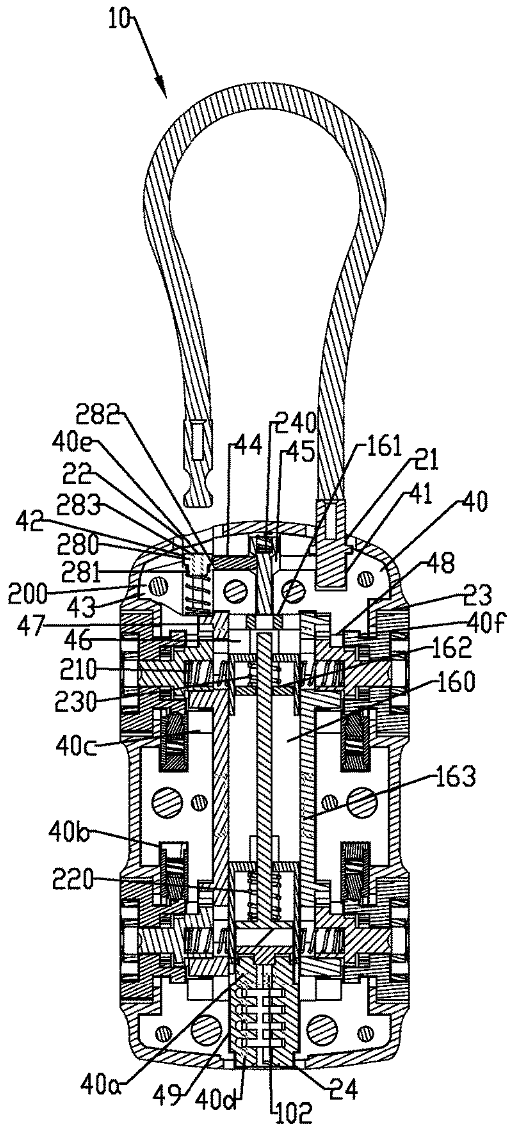
FIG. 29B is a rear cross-sectional view of the third embodiment of the combination padlock with the key removed after unlocking the padlock.

Second Embodiment of the combined-dial FIGS. 24A-24B

A combined-dial 270 is shown in FIGS. 24A-24B which contains all of the exact functions of exterior/inner-dial 110/120 except with respect to the rivet-hole 111 and the rivet 122. The combined-dial 270 contains the following important elements:

1. Teeth 271 which are similar to 121 teeth of inner-dial 120 and which have the same functionality as described above.
2. Reset hole 272 which is similar to reset hole 112/123of the exterior/inner dial 110/120 and which has the same functionality as described above.
3. Ratchet-slot 273 which is similar to ratchet-slot 124 of the inner-dial 120 and which has the same functionality as described above.

Third Embodiment of using combined dial and new rod FIGS. 25-29B:

The new rod 280 is a replacement of spring-load-member 190. The torque spring 200 will now replace by rod spring 290.

The third embodiment is an improvement by combining using the combined dial 270 and the new rod 280 with a spring 290 to push the flexible-end 52 of the cable 50 out more smoothly and easily. The spring 290 is being placed in the spring-receive-cutout 281 of the rod 280. The spring 290 will push the rod 280 upward and the flexible-end 52 upward in the unlocking modes. The functionality of the rod 280/rod spring 290 will be exactly the same for the spring-load-member 190/torque spring 200.

What is claimed is:

1. An object padlock, comprising:

an object looking cover/body;

a primary control mechanism comprising at least one dial having an inner-dial configured to control operation of the object padlock, wherein the primary control mechanism is a combination control mechanism, a cable a fixed end always in the object padlock and a flexible-end configured to be locked and opened via at least the combination control mechanism, wherein when the flexible-end is locked the object padlock is in a locked mode, and when the flexible-end is opened via the combination control mechanism the object padlock is in a combination lock open mode, a second control mechanism comprising at least a cylinder configured to control operation of the object padlock, wherein the secondary control mechanism is a key mode control mechanism, and when the flexible-end of the cable is opened via the key mode control mechanism the object padlock is in a key lock open mode, a clutch for each dial of the at least one dial, and each clutch operatively engaged with the corresponding inner-dial of each dial of the at least one dial, at least one control plate configured for operative engagement with at least one clutch of the at least one clutches and configured to control opening of the object padlock at least through the combination control mechanism, a connected plate configured fro operative engagement with the at least one control plate, and a button configured for operative engagement with the at least one control plate, wherein the control plate comprises a cutout configured to receive an extended-pointer of the connected plate and a wing of the button, so that the control plate, the connected plate and the button are in a sandwiched position and configured to move jointly together.

2. The object padlock according to claim 1, wherein the object looking body/cover comprises a first side and a second side positioned opposite the first side, wherein at least one dial of the at least one dial of the combination control mechanism are positioned on each of the first side and the second side of the object looking body/cover.

3. The object padlock according to claim 2, wherein the at least two dials of the at least one dial of the combination control mechanism are positioned on each of the first side and the second side of the object looking body/cover.

4. The object padlock according to claim 2, wherein each of the dials of the at least one dial of the combination control mechanism is in a form of a wheel of a vehicle.

5. The object padlock according to claim 1, wherein each dial comprises at least two of the following elements:

a) an exterior-dial with a rivet-hole to bond to the inner-dial, b) the inner-dial with one or more rivets to bond to the exterior-dial, c) a wheel-cover configured for a press fit to bond with the exterior-dial to cover the one or more rivets.

6. The object padlock according to claim 1, wherein each control-plate of the at least one control-plate comprises at least one extended-pin, and each clutch of the at least one clutch comprises a true gate and at least one false gate, wherein when all of the at least one extended-pins are aligned with the true gate of the clutch corresponding to each extended-pin the object padlock can be opened to the combination lock open mode by the combination control mechanism, and wherein each of the at least one false gates are configured to inhibit the object padlock from being opened to the combination lock open mode via the combination control mechanism.

7. The object padlock according to claim 6, wherein a number of the at least one extended-pins is equal to a number of the at least one clutches.

8. The object padlock according to claim 1, wherein the object padlock is in the locked mode the object padlock cannot be operated to a reset mode, and wherein when the object padlock is in the combination lock open mode the object padlock can be operated to the reset mode.

9. The object padlock according to claim 8, wherein each control plate of the at least one control-plate comprises at least one curved-surface for each clutch operatively engaged with the control plate, wherein each of the at least one curved surface is configured to restrict movement of the corresponding clutch from movement to a reset position when the object padlock is in the locked mode, and wherein when each clutch of the at least one clutches are in the reset position, the object padlock may be operated to the reset mode.

10. The object padlock according to claim 8, wherein each control plate of the at least one control-plate comprises at least one hole configured to allow a clutch-spring to pass through, wherein each hole of the at least one hole is configured to avoid interference of the control plate with the function of the clutch-spring when the object padlock is in the locked mode, the combination lock open mode, the key lock open mode and the reset mode.

11. The object padlock according to claim 1, wherein each clutch of the at least one clutch comprises one or more teeth-slots configured to engage with one or more teeth of the corresponding inner dial, and wherein each dial of the at least one dial further comprise an exterior dial and rotation of the exterior dial is transferred to the inner dial and the clutch.

12. The object padlock according to claim 11, wherein the exterior dial comprises at least one a rivet-hole and the inner-dial comprises at least a rivet configured to engage with the at least one rivet-hole in order to join the exterior dial and interior dial together to control rotation of the clutch.

13. The object padlock according to claim 1, further comprising a cam operatively connected to a bolt configured for engagement with and disengagement from a bolt-receiving-cutout of the flexible-end of the cable, wherein when the bolt is engaged with the bolt-receiving-cutout the flexible end is locked and when the bolt is disengaged from the bolt-receiving-cutout the flexible end is opened, and wherein the connected-plate comprises a contact-wall configured for operative engagement of a tail of the cam.

14. The object padlock according to claim 1, wherein the combination control mechanism comprises an exterior-dial for each of the at least one inner dials, the at least one inner-dial, the clutch for each of the at least one inner dials, the at least one control-plate, the connected-plate, the button, and a spring-load-member, and wherein the combination control mechanism is configured to control movement of a cam and a bolt to cause the bolt to engage with and disengage a blot-receiving-cutout of the flexible-end of the cable.

15. The object padlock according to claim 14, wherein the exterior-dial, the inner-dial, and the clutch are positioned perpendicular to the position of the control-plate, the connected-plate, and the button.

16. The object padlock according to claim 14, wherein a reset button is integrated into the clutch and the exterior-dial, and the inner-dial comprises a hole configured to allow the reset button to pass through.

17. The object padlock according to claim 6, wherein each clutch comprises more than one false gate to increase the level of difficulty to locate the true gate.

18. The object padlock according to claim 6, wherein the true gate of each clutch comprises a deep cut configured to receive the corresponding extended-pin of the corresponding control plate when the object padlock is in a reset model.

19. The object padlock according to claim 13, wherein the cam is operable between a locking position and an unlocking position, wherein the object padlock comprises a cam spring configured to urge the cam into the locking position, wherein the tail of the cam is configured for operative engagement with the combination control mechanism and the key mode control mechanism to allow either the combination control mechanism or the key mode control mechanism to operate the cam to the unlocking position, wherein the bolt comprises a flat end configured for operative engagement with the cam and a round end configured for operative engagement with the bolt receiving cutout of the flexible end of the cable, wherein when the cam is in the unlocking position the flat end of the bolt will operatively contact a slope of the cam and the round end of the bolt will disengage from the bolt receiving cutout of the flexible end of the cable.

20. The object padlock according to claim 19, wherein the tail of the cam has a shape and size configured to engage with a tail of an extended-cam and to avoid interference with a contact-wall of the connected-plate when the object padlock is in the key lock open mode via the key mode control mechanism.

21. The object padlock according to claim 19, wherein the tail of the cam has a shape and size configured to allow movement of the contact-wall of the connected-plate and will not interfere with a tail of an extended-cam when the object padlock is in the combination lock open mode via the combination control mechanism.

22. The object padlock according to claim 1, further comprising a cam operatively connected to a bolt configured for engagement with and disengagement from a bolt-receiving-cutout of the flexible-end of the cable, wherein when the bolt is engaged with the bolt-receiving-cutout of the flexible end is locked and when the bolt is disengaged from the bolt-receiving-cutout the flexible end is opened, and wherein the key mode control mechanism further comprises an extended-cam, a short-cam operatively coupled to the cylinder, wherein the extended-cam and the short-cam are configured to control movement of the cam to cause the engagement and disengagement of the bolt and the bolt-receiving-cutout of the flexible-end of the cable.

23. The object padlock according to claim 22, wherein the cam is operable between a locking position and an unlocking position, wherein the short-cam and the extended-cam each contain at least one slope configured for operative engagement to urge a tail of the extended-cam contact the tail of the cam and operate the cam from the locking position to the unlocking position.

24. The object padlock according to claim 23, wherein the tail of the extended-cam comprises a shape configured to restrict rotational movement of the extended-cam, so that rotational movement of the short-cam is converted to rectilinear movement of the extended-cam, wherein the object looking cover/body comprises a slot configured to receive at least a portion of the tail of the extended-cam, and wherein a cross-sectional shape of the tail of the extended-cam is square of rectangular.

25. The object padlock according to claim 11, wherein when the object padlock is in the locked mode, the combination lock open mode or the key lock open mode the teeth-slots of each clutch are engaged with the teeth of the corresponding inner dial the clutch comprises the teeth-slot and teeth of inner dial will engage in the lock mode and open of primary/secondary mode, wherein the teeth-slot of each clutch and the teeth of each inner dial will disengage in a reset mode of the object padlock, wherein the object padlock further comprises a reset button configured to disengage the teeth of the inner dial and the teeth-slot of the clutch to operate the object padlock to the reset mode.

26. The object padlock according to claim 25, wherein each control plate of the at least one control-plate comprises at least one curved-surface for each clutch operatively engaged with the control plate, wherein when the object padlock is in the reset mode the at least one curved-surface of the control plate will be spaced apart from the corresponding clutch of the at least one clutch to allow the corresponding clutch to move into a reset position.

27. The object padlock according to claim 5, wherein the exterior-dial and the inner-dial are integrated as a combined-dial.

28. An object padlock, comprising:

an object looking cover/body, at least one dial to control operation of the object padlock as a primary control mechanism, wherein the primary control mechanism is a combination control mechanism, a cable with a fixed end always in the object padlock and a flexible-end configured to be locked and opened via at least the combination control mechanism, and a secondary control mechanism comprising at least a cylinder to control operation of the object padlock, wherein the second control mechanism is a key mode control mechanism, wherein the object looking cover/shape has the shape of a car, and the object padlock further comprises four dials, wherein the dials have an appearance of wheels, wherein the combination control mechanism comprises an exterior-dial, inner-dial, a clutch, a control-plate, a connected-plate, a button, and a spring-loaded member configured to control movement of a cam and a bolt to cause engagement and disengagement of the bolt and a bolt-receiving-output of the flexible-end of the cable.

29. An object padlock, comprising an object looking cover/body, a primary control mechanism comprising at least one dial comprising an inner-dial configured to control operation of the object padlock, wherein the primary control mechanism is a combination control mechanism, a cable having a fixed end always in the object padlock and a flexible-end configured to be locked and opened via at least the combination control mechanism, a secondary control mechanism comprising at least a cylinder to control operation of the object padlock, wherein the second control mechanism is a key mode control mechanism, a clutch for each dial of the at least one dial, and each clutch operatively engaged with the inner-dial of each dial of the at least one dial, at least one control plate configured for operative engagement with at least one clutch and configured to control opening of the object padlock at least through the combination control mechanism, a connected plate configured for operative engagement with the at least one control plate, and a button configured for operative engagement with the at least one control plate, wherein the object looking cover/shape has the shape of an animal with four legs, wherein each dial has a appearance of one of the legs of the four legs, wherein the control plate comprises a cutout configured to receive an extended-pointer of the connected plate and a wing of the button, so that the control plate, the connected plate and the button are in a sandwiched position and configured to move jointly together.

30. The object padlock according to claim 29, further comprising a cam operatively connected to a bolt configured for engagement with and disengagement from a bolt-receiving-cutout of the flexible-end of the cable, wherein when the bolt is engaged with the bolt-receiving-cutout the flexible end is locked and when the bolt is disengaged from the bolt-receiving-cutout the flexible end is opened, wherein the cam is operable between a locking position and an unlocking position, wherein the object padlock comprises a cam spring configured to urge the cam into the locking position, wherein the tail of the cam is configured for operative engagement with the combination control mechanism and the key mode control mechanism to allow either the combination control mechanism or the key mode control mechanism to operate the cam to the unlocking position, wherein the bolt comprises a flat end configured for operative engagement with the cam and a round end configured for operative engagement with the bolt receiving cutout of the flexible end of the cable, wherein when the cam is in the unlocking position the flat end of the bolt will operatively contact a slope of the cam and the round end of the bolt will disengage from the bolt receiving cutout of the flexible end of the cable.

31. The object padlock according to claim 30, wherein the tail of the cam has a shape and size configured to engage with a tail of an extended-cam and to avoid interference with a contact-wall of the connected-plate when the object padlock is in the key lock open mode via the key mode control mechanism.

* * * * *